United States Patent
Park et al.

(10) Patent No.: US 10,282,581 B2
(45) Date of Patent: May 7, 2019

(54) FINGER PRINT AND PRESSURE DUAL SENSOR AND METHOD OF MANUFACTURING THE SAME

(71) Applicant: UNIST(ULSAN NATIONAL INSTITUTE OF SCIENCE AND TECHNOLOGY), Ulsan (KR)

(72) Inventors: Jang Ung Park, Ulsan (KR); Byeong Wan An, Ulsan (KR)

(73) Assignee: UNIST(ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 91 days.

(21) Appl. No.: 15/716,463

(22) Filed: Sep. 26, 2017

(65) Prior Publication Data
US 2019/0026519 A1   Jan. 24, 2019

(30) Foreign Application Priority Data
Jul. 21, 2017   (KR) .................. 10-2017-0092831

(51) Int. Cl.
G06K 9/00       (2006.01)
G01L 1/14       (2006.01)
G06F 3/041      (2006.01)

(52) U.S. Cl.
CPC ............ *G06K 9/0002* (2013.01); *G01L 1/142* (2013.01); *G06F 3/0414* (2013.01);
(Continued)

(58) Field of Classification Search
CPC . G06K 9/00013; G06K 9/0002; G06K 9/0004
See application file for complete search history.

(56) References Cited

U.S. PATENT DOCUMENTS

| 2004/0051155 A1* | 3/2004 | Oka ..................... G06K 9/0002 257/414 |
| 2005/0213173 A1* | 9/2005 | Sasaki ................. G06K 9/0004 358/514 |

(Continued)

FOREIGN PATENT DOCUMENTS

| KR | 20-0392690 Y1 | 8/2005 |
| KR | 10-2016-0149919 A | 12/2016 |

(Continued)

*Primary Examiner* — Utpal D Shah
(74) *Attorney, Agent, or Firm* — Revolution IP, PLLC

(57) ABSTRACT

A finger print and pressure dual sensor includes first electrodes disposed on a substrate and extending in a first direction, and source electrodes and drain electrodes disposed to face each other in the first direction; channel regions disposed on the substrate and electrically connected to the source electrode and drain electrode; a first dielectric layer disposed on the substrate, covering the first electrodes, the source electrodes, and the drain electrodes and having first openings for exposing the channel region; second electrodes disposed on the first dielectric layer and extending in a second direction; a second dielectric layer disposed on the first dielectric layer, covering the second electrodes and having second openings for exposing the channel region; gate electrodes disposed on the second dielectric layer, extending in the second direction and disposed on the channel region; and a cover layer disposed on the second dielectric layer and covering the gate electrodes.

20 Claims, 25 Drawing Sheets

(52) U.S. Cl.
CPC .. *G06K 9/0008* (2013.01); *G06F 2203/04112* (2013.01); *G06K 9/00053* (2013.01)

(56) References Cited

U.S. PATENT DOCUMENTS

| | | | |
|---|---|---|---|
| 2007/0257256 A1* | 11/2007 | Kugler | B82Y 10/00 257/40 |
| 2011/0198484 A1* | 8/2011 | Kurokawa | H01L 27/146 250/214 R |
| 2017/0078513 A1* | 3/2017 | Chang | G06F 3/0488 |
| 2017/0110678 A1* | 4/2017 | Zang | G01N 27/4141 |
| 2018/0129043 A1* | 5/2018 | Kim | G06F 3/042 |
| 2018/0277660 A1* | 9/2018 | Liu | H01L 29/66742 |
| 2018/0301566 A1* | 10/2018 | Ito | H01L 21/8234 |
| 2018/0357460 A1* | 12/2018 | Smith | G06K 9/4661 |
| 2019/0006441 A1* | 1/2019 | Ling | H01L 27/32 |
| 2019/0042824 A1* | 2/2019 | Zheng | G06K 9/00 |

FOREIGN PATENT DOCUMENTS

| | | | |
|---|---|---|---|
| KR | 10-2017-0040400 A | 4/2017 | |
| KR | 10-2017-0042942 A | 4/2017 | |

\* cited by examiner

US 10,282,581 B2

FINGER PRINT AND PRESSURE DUAL SENSOR AND METHOD OF MANUFACTURING THE SAME

CROSS-REFERENCE TO RELATED PATENT APPLICATIONS

This application claims the benefit of Korean Patent Application No. 10-2017-0092831, filed on Jul. 21, 2017, in the Korean Intellectual Property Office, the disclosure of which is incorporated herein in its entirety by reference.

BACKGROUND OF THE INVENTION

1. Field of the Invention

The present invention relates to a finger print and pressure dual sensor and a method of manufacturing the same.

2. Description of the Related Art

Recently, mobile devices have a tendency to have a large-sized screen. Thus, these mobile devices have been developed to minimize the number of physical buttons including a home button or to remove the physical buttons. As these physical buttons have a tendency to be removed, the development of a button integrated with a display has been accelerated. Also, as a button using a finger print has emerged, the development of a finger print sensor and a pressure sensor, which are integrated with the display, is required.

A finger print sensor generally uses a capacitance method. The capacitance method can be largely classified into a unit cell driving method and a matrix driving method. In the unit cell driving method, a sensor that recognizes a finger print includes a plurality of unit cells that are individually driven. The plurality of unit cells can be formed of various materials including an indium tin oxide, silicon, and the like, and less noise occurs. However, because a process is complicated and the unit cells include many layers and thus transparency thereof is decreased. Thus, there is a limitation in using the unit cells as transparent electrodes.

In the matrix driving method, an upper electrode that extends in an x-axis direction, and a lower electrode that extends in a y-axis direction, are spaced apart from each other by a predetermined distance and cross each other so that a line-by-line shape can be formed. The structure of a device is simple, and the device can be manufactured using only the upper electrode and the lower electrode so that transmittance is high. On the other hand, much noise occurs, and the device need to be driven with a high frequency of 10 kHz or higher. The indium tin oxide used to form the transparent electrodes has a high resistance value so that there is a limitation in driving the device in a high frequency band of 10 kHz or higher. In addition, the indium tin oxide has low flexibility and thus is difficult to be used in a flexible display.

Meanwhile, the pressure sensor that is a device for converting mechanical energy into electrical energy is used to measure an absolute pressure or gauge pressure. Various types of pressure sensors, such as a strain gauge type metal pressure sensor, a piezoresistive pressure sensor, a piezoelectric pressure sensor, a metal oxide semiconductor field effect transistor (MOSFET) type pressure sensor, a piezojunction type pressure sensor, an optical fiber pressure sensor, and a piezocapacitive pressure sensor, have been suggested and used.

In order to apply such a finger print sensor and pressure sensor to a display, transparent electrodes having high transmittance and high electrical conductivity are required, and an integrated structure of the finger print sensor and the pressure sensor is required for structure simplification.

SUMMARY OF THE INVENTION

The present invention provides a finger print and pressure dual sensor, whereby a finger print and pressure can be simultaneously sensed with high transmittance and high electrical conductivity.

The present invention also provides a method of manufacturing a finger print and pressure dual sensor.

However, these objectives are just examples, and the technical concept of the present invention is not limited thereto.

According to an aspect of the present invention, there is provided a finger print and pressure dual sensor including: first electrodes disposed on a substrate and extending in a first direction, and source electrodes and drain electrodes disposed to face each other in the first direction; channel regions disposed on the substrate and electrically connected to the corresponding source electrode and drain electrode; a first dielectric layer disposed on the substrate, covering the first electrodes, the source electrodes, and the drain electrodes and having first openings for exposing the channel region; second electrodes disposed on the first dielectric layer and extending in a second direction; a second dielectric layer disposed on the first dielectric layer, covering the second electrodes and having second openings for exposing the channel region; gate electrodes disposed on the second dielectric layer, extending in the second direction and disposed on the channel region so as to correspond to the channel region; and a cover layer disposed on the second dielectric layer and covering the gate electrodes.

The finger print and pressure dual sensor may further include a capacitive change layer formed by the first openings and the second openings and disposed between the channel region and the gate electrodes.

The second dielectric layer may include an elastic material, and a thickness of the second dielectric layer may be changed by an external pressure so that a capacitance of the capacitive change layer is changed and thus the external pressure is sensed.

The capacitive change layer may include air, polydimethylsiloxane (PDMS), polyimide, nusil, acetic acid, ethanol, methanol, pyridine, or water.

The second dielectric layer may have an elastic factor that is equal to or greater than 1 GPa and is equal to or less than 20 GPa and a thickness in the range between 0.1 and 5 mm.

The first dielectric layer may include a hard material, and a thickness of the first dielectric layer may not be changed by an external pressure.

The first dielectric layer may have a dielectric constant that is equal to or greater than 2 and is equal to or less than 15 and a thickness in the range between 10 nm and 50 μm.

The source electrodes, the drain electrodes, and the channel region may be disposed between the first electrodes, and the gate electrodes may be disposed between the second electrodes.

The source electrodes and the drain electrodes may include the same material as a material used to form the first electrodes.

Each of the first electrodes may have a width that is greater than 0 μm and is equal to or less than 150 μm, a distance that is equal to or greater than 2 μm and is equal to or less than 50 µm, transmittance that is equal to or less than 70% and is less than 100% with respect to light having a wavelength of 550 nm, a surface resistance that is greater than 0Ω/□ and is equal to or less than 20Ω/□, and capacitance that is equal to or greater than 10 fF and is equal to or less than 500 µF, and during a contact of a finger print, a reduction in the capacitance that is equal to or greater than 0.01% and is equal to or less than 50% may be shown.

Each of the second electrodes may have a width in a range between 0 and 150 µm and a distance in a range between 2 and 50 µm.

A finger print sensor unit cell configured when the first, single electrode and the second, single electrode cross each other, may have a capacitance in a range between 10 fF and 500 µF.

The cover layer may have a dielectric constant that is equal to or greater than 4 and is equal to or less than 15 and transmittance that is equal to or greater than 70% and is less than 100%.

At least one of the first electrodes, the second electrodes, the source electrodes, the drain electrodes, and the gate electrodes may include a hybrid structure formed by combining a first nanostructure having a first diameter and a second nanostructure having a smaller second diameter than the first diameter.

The first nanostructure may have the first diameter that is equal to or greater than 100 nm and is equal to or less than 10 µm, and the second nanostructure may have the second diameter that is equal to or greater than 10 nm and is equal to or less than 100 nm.

The first nanostructure may form a main conduction path, and the second nanostructure may be disposed in an empty space formed by the first nanostructure and may electrically connect the first nanostructures to each other, thereby providing an auxiliary conduction path.

When a conduction path of the first nanostructure is opened, a conduction path may be provided by the second nanostructure.

A ratio of the first nanostructure with respect to the second nanostructure may be 10:90 to 90:10.

The finger print and pressure dual sensor may have a driving frequency that is equal to or greater than 10 kHz and is equal to or less than 1 MHz, a change in capacitance that is equal to or greater than 0.01% and is equal to or less than 50% according to a ridge and a valley of a finger print, and a driving voltage in a range between 1 and 100 V.

According to another aspect of the present invention, there is provided a method of manufacturing a finger print and pressure dual sensor, the method including: forming first electrodes that extend in a first direction and source electrodes and drain electrodes disposed to face each other in the first direction, on a substrate; forming channel regions that electrically connect the corresponding source electrode and drain electrode to each other, on the substrate; forming a first dielectric layer that covers the first electrodes, the source electrodes and the drain electrodes and has first openings for exposing the channel region, on the substrate; forming second electrodes that extend in a second direction, on the first dielectric layer; forming a second dielectric layer that covers the second electrodes and has second openings for exposing the channel region, on the first dielectric layer; forming gate electrodes that extend in the second direction and disposed on the channel region so as to correspond to the channel region, on the second dielectric layer; and forming a cover layer that covers the gate electrodes, on the second dielectric layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
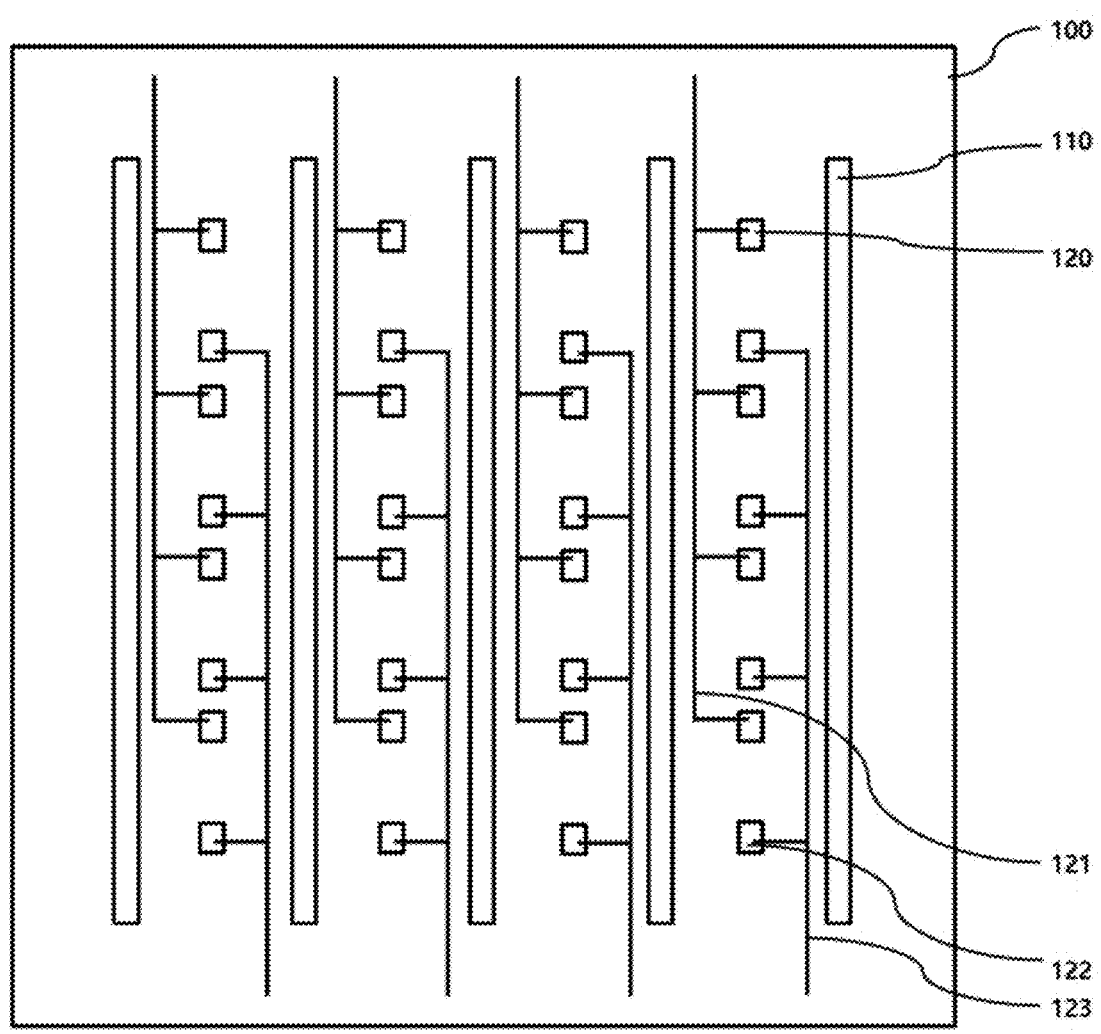
FIGS. 1 through 7 are plan views illustrating a method of manufacturing a finger print and pressure dual sensor according to an embodiment of the present invention.

Hereinafter, exemplary embodiments of the present invention will be described in detail with reference to the attached drawings. The embodiments of the present invention are provided to those skilled in the art so as to more fully describe the technical concept of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Furthermore, various elements and regions in the drawings are schematically shown. Thus, the technical concept of the present invention is not limited by a relative size or distance in the attached drawings.

FIGS. 1 through 7 are plan views illustrating a method of manufacturing a finger print and pressure dual sensor according to an embodiment of the present invention.

Referring to FIG. 1, first electrodes 110 that extend in a first direction, and source electrodes 120 and drain electrodes 122 that are disposed to face each other in the first direction, are formed on a substrate 100. Also, source electrode wirings 121 electrically connected to the source electrodes 120, and drain electrode wirings 123 electrically connected to the drain electrodes 122 are formed. The first electrodes 110 are electrodes for a finger print sensor, and the source electrodes 120 and the drain electrodes 122 are electrodes for a pressure sensor.

The substrate 100 may include a hard material and a transparent material through which light passes. The substrate 100 performs a function of supporting elements disposed thereon and may be omitted if necessary. Alternatively, the substrate 100 may refer to an element of a display that displays a screen such as a liquid crystal display (LCD) or an organic light-emitting diode (OLED).

Each of the source electrodes 120 and each of the drain electrodes 122 may be disposed between the first electrodes 110. The first electrodes 110, the source electrodes 120, and the drain electrodes 122 may be formed by a patterning method in the same process or different processes. Also, the first electrodes 110, the source electrodes 120, and the drain electrodes 122 may include the same material or different materials. For example, the first electrodes 110, the source electrodes 120, and the drain electrodes 122 may be simultaneously formed using the same material in the same process.

Each of the source electrode wirings 121 may electrically connect each source electrode 120 to the outside. Each of the drain electrode wirings 123 may electrically connect each drain electrode 122 to the outside. In the current embodiment, the source electrode wirings 121 that are respectively connected to the source electrodes 120 are integrated as one wiring and are electrically connected to the outside, and the drain electrode wirings 123 that are respectively connected to the drain electrodes 122 are integrated as one wiring and are electrically connected to the outside. Another embodiment will be described later with reference to FIG. 11.

Each of the first electrodes 110, the source electrodes 120, the source electrode wirings 121, the drain electrodes 122, and the drain electrode wirings 123 may include a transparent material through which light passes. Also, each of the first electrodes 110, the source electrodes 120, and the drain electrodes 122 may include a material through which light having a desired wavelength passes selectively. Each of the first electrodes 110, the source electrodes 120, and the drain electrodes 122 may include indium tin oxide (ITO), indium oxide ($In_2O_3$), tin oxide ($SnO_2$), graphene, carbon nanotube, metal nanowire, metal nanomesh, metal nanofiber, metal nanotrough, conducting polymer, silver norfloxacin (AgNF), and silver nanowires (AgNW), for example. Also, each of the first electrodes 110, the source electrodes 120, and the drain electrodes 122 may include a nanostructure that will be described below.

Figure 2:
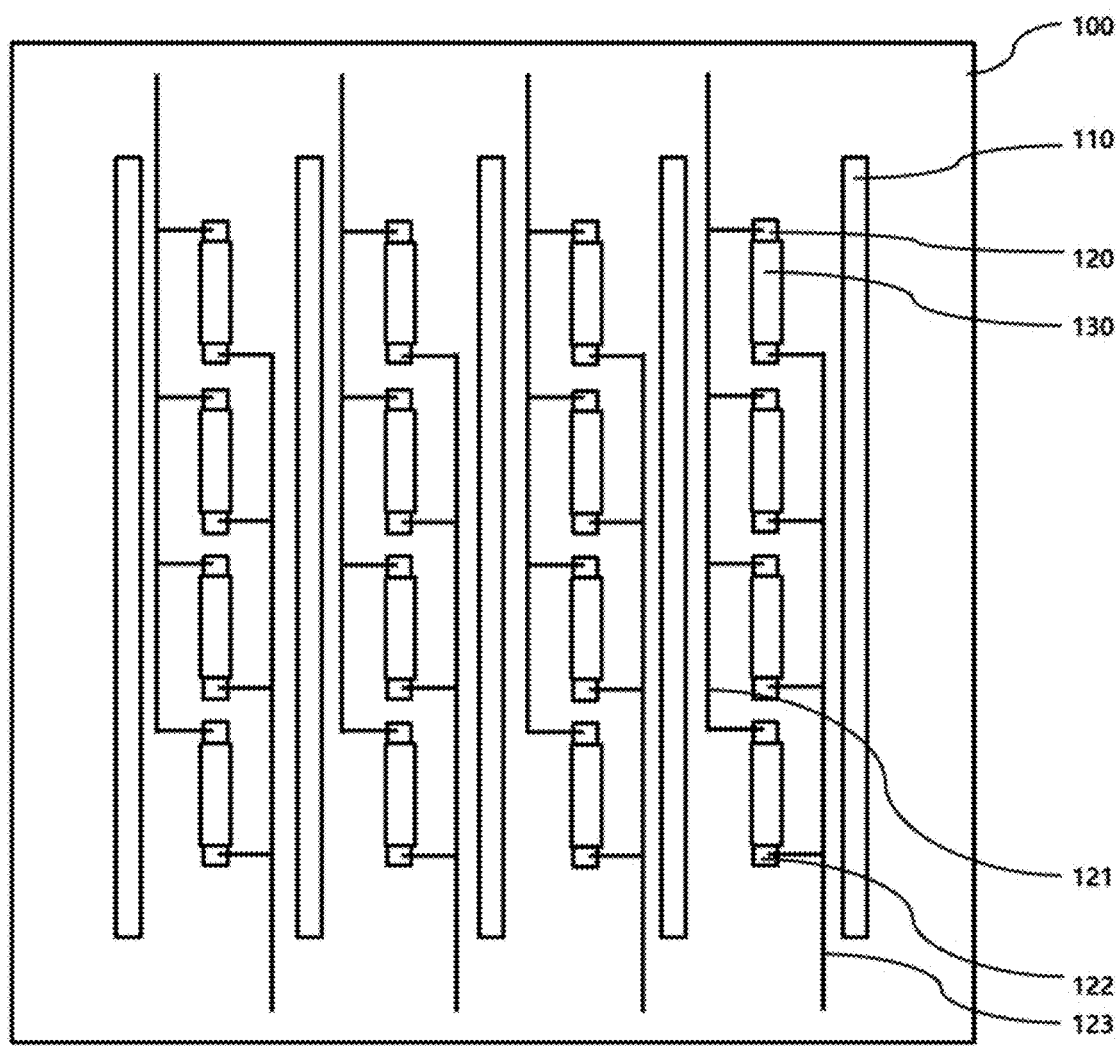

Referring to FIG. 2, each of channel regions 130 that connects the corresponding source electrode 120 and drain electrode 122 to each other, is formed on the substrate 100. The channel regions 130 may extend in the first direction and may be disposed between the first electrodes 110. The channel regions 130 may be directly physically connected to each of the source electrodes 120 and the drain electrodes 122 or electrically coupled thereto. In FIG. 2, the channel regions 130 are formed using a matrix method of 4×4. However, this is just an example, and the technical concept of the preset invention is not limited thereto.

The channel region 130 may include various materials having a current level varying due to a voltage of gate electrodes 170. The channel region 130 may include a semiconductor material, for example, or a transparent material through which light passes, to be applied to a display, or a material through which light having a desired wavelength passes selectively. For example, the channel region 130 may include graphene, a carbon material including carbon nanotube, an oxide semiconductor material, such as indium zinc oxide (IZO), zinc tin oxide (ZTO), or indium gallium zinc oxide (IGZO), an organic semiconductor material including pentacene and poly-3-hexylthiophene (P3HT), a metal nanowire, and gallium nitride (GaN). Also, the channel region 130 may include Si, Ge, Sn, SiC, BN, BP, AlN, AlP, AlAs, GaN, GaAs, GaSe, $TiO_2$, CuO, FeO, $In_2O_3$, IZO, IGZO, and $Al_2O_3$. However, this is just an example, and all materials that perform a channel function, are included in the technical concept of the present invention.

Figure 3:
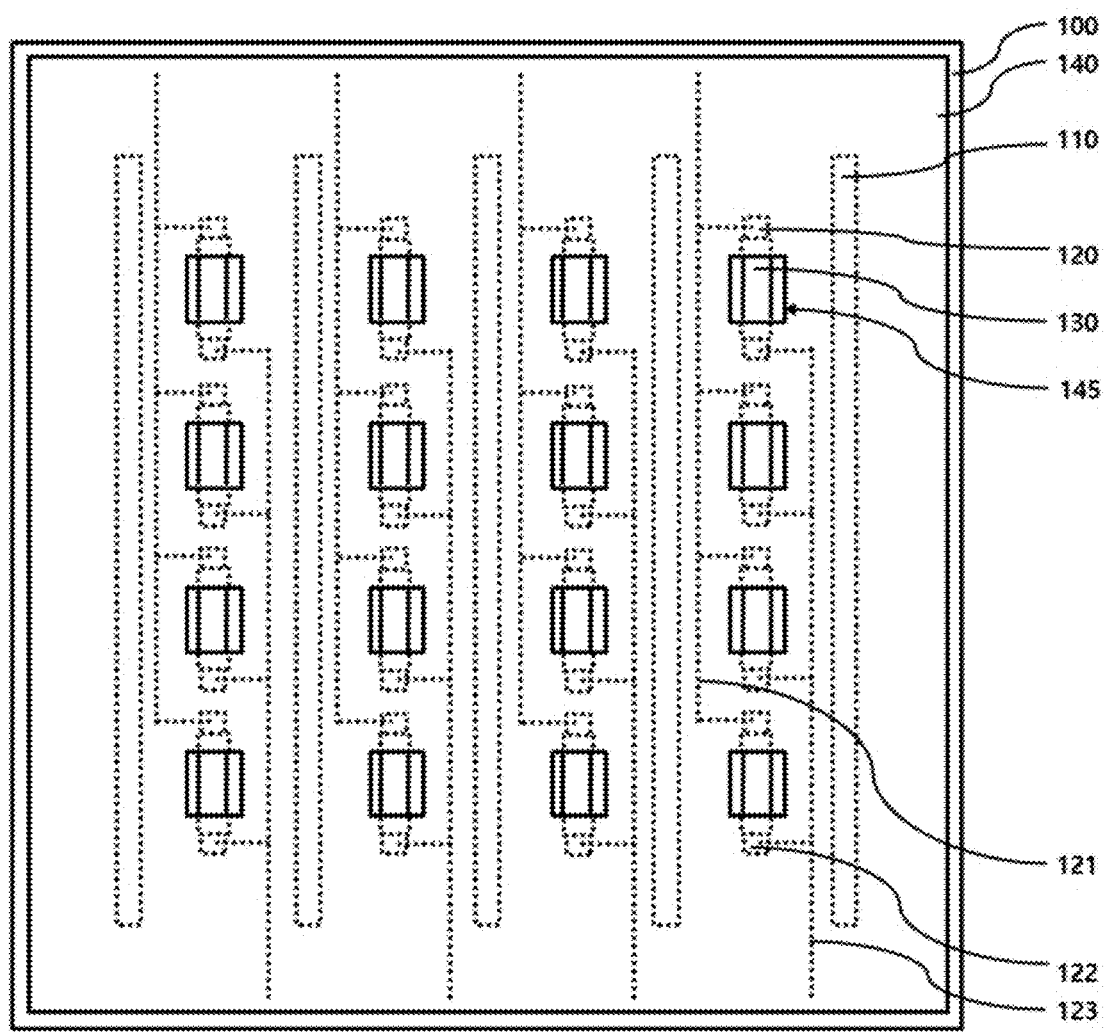

Referring to FIG. 3, a first dielectric layer 140 is formed on the substrate 100. The first dielectric layer 140 may cover the first electrodes 110, the source electrodes 120, and the drain electrodes 122 entirely. The first dielectric layer 140 may include a plurality of first openings 145, and a portion or the whole of the channel region 130 may be exposed by the plurality of first openings 145. For your reference, the first electrodes 110, the source electrodes 120, the source electrode wirings 121, the drain electrodes 122, and the drain electrode wirings 123 are indicated by dotted lines, which mean that they are disposed below the first dielectric layer 140.

The first dielectric layer 140 may include a transparent material through which light passes. Also, the first dielectric layer 140 may include a material through which light having a desired wavelength passes selectively. Also, the first dielectric layer 140 may be formed of a hard material of which thickness is not changed with respect to an external pressure. Thus, damage of the second electrode 150 formed in a subsequent process may be prevented. The first dielectric layer 140 may include glass, quartz, silicon oxide, aluminum oxide, hafnium oxide, or polymer, and for example, epoxy-based photoresist such as SU-8, polyvinyl alcohol (PVA), polyvinylpyrrolidone (PVP), polyimide, polyethylenenaphthalate (PEN), polyethyleneterephthalate (PET), polymethylmethacrylate (PMMA), and polydimethylsiloxane (PDMS). The first dielectric layer 140 may be formed using various methods such as spin coating, deposition, and the like.

Figure 4:
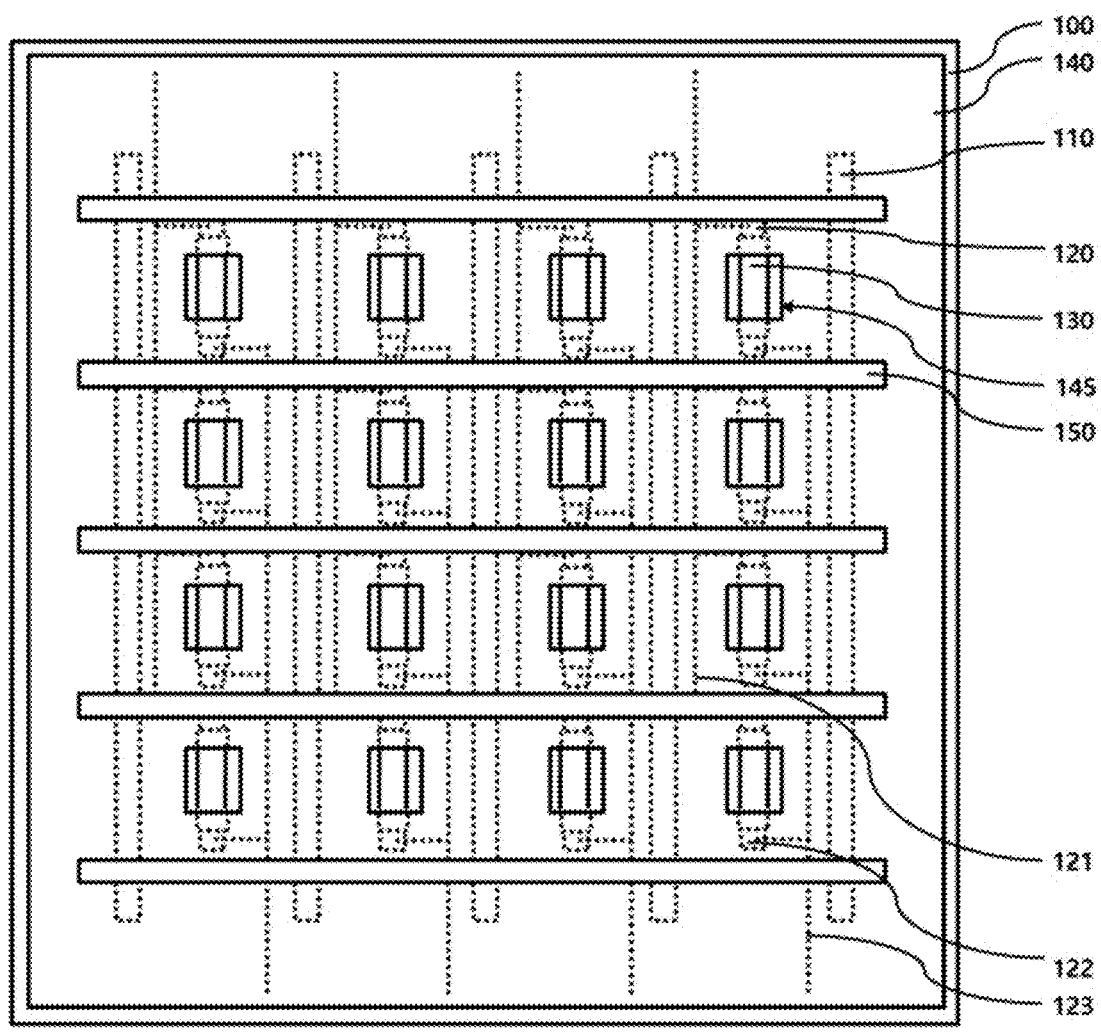

Referring to FIG. 4, second electrodes 150 are formed on the first dielectric layer 140. The second electrodes 150 are electrodes for a finger print sensor. The second electrodes 150 extend in a second direction having a predetermined angle with respect to the first direction. The predetermined angle may be greater than 0° or be equal to or less than 90°, and for example, the first electrodes 110 and the second electrodes 150 may be perpendicular to each other. The second electrodes 150 may be disposed between the channel regions 130 and may not cross the channel regions 130. Thus, the first dielectric layer 140 may be disposed between the first electrodes 110 and the second electrodes 150 and may electrically insulate the first electrodes 110 and the second electrodes 150 from each other.

The second electrodes 150 may include a transparent material through which light passes. Also, the second electrodes 150 may include a material through which light having a desired wavelength passes selectively. The second electrodes 150 may include ITO, $In_2O_3$, $SnO_2$, graphene, carbon nanotube, metal nanowire, metal nanomesh, metal nanofiber, metal nanotrough, conducting polymer, AgNF, and AgNW, for example. The second electrodes 150 may include the same material as a material used to form the first electrodes 110 or a different material from the material used to form the first electrodes 110. Also, the second electrodes 150 may include a nanostructure that will be described below.

Figure 5:
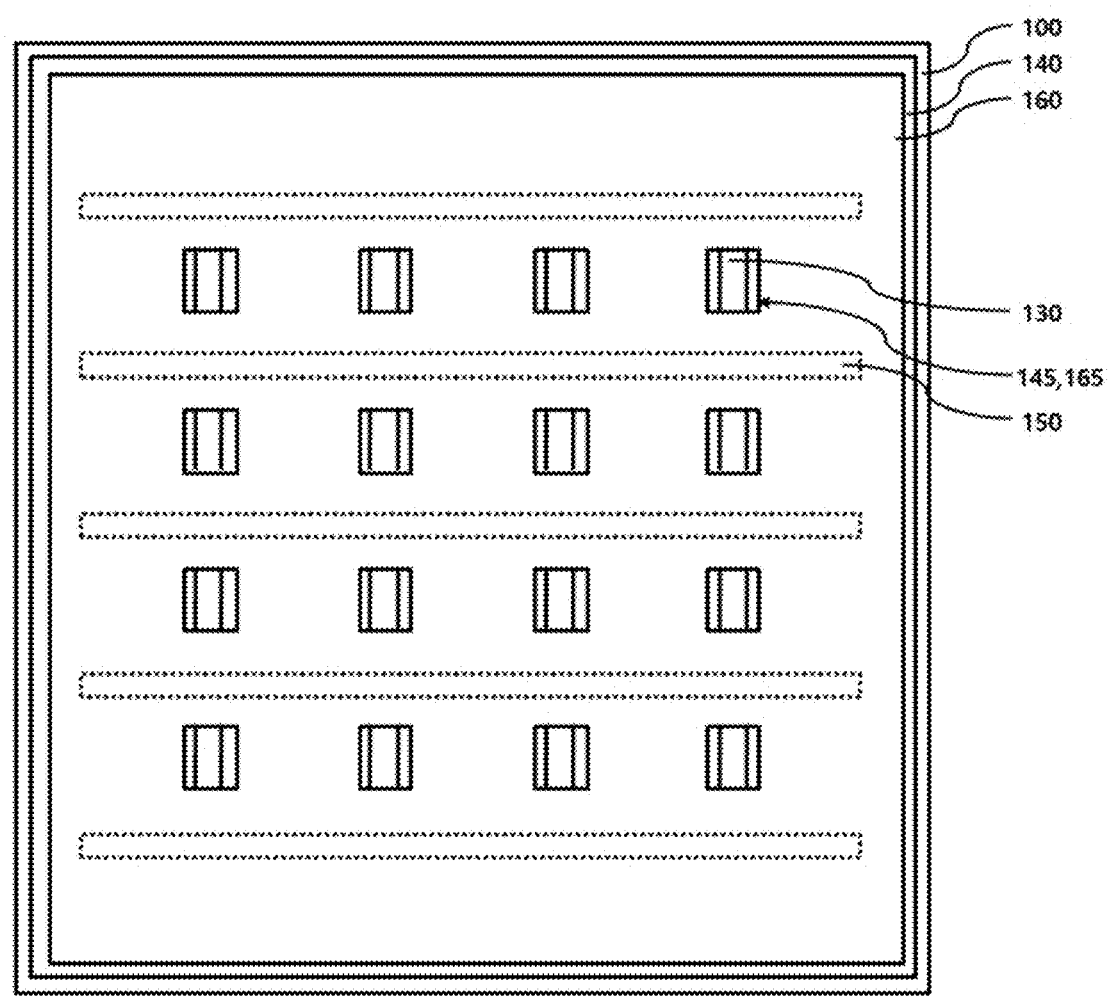

Referring to FIG. 5, a second dielectric layer 160 is formed on the first dielectric layer 140. The second dielectric layer 160 may cover the second electrodes 150 entirely. The second dielectric layer 160 includes a plurality of second openings 165, and the channel region 130 is exposed by the plurality of second openings 165. The first openings 145 and the second openings 165 may overlap each other and may be disposed in the same position so that the channel region 130 is exposed. The first openings 145 and the second openings 165 may have the same size or different sizes. For your reference, the second electrodes 150 are indicated by dotted lines, which mean that they are disposed below the second dielectric layer 160, and the first electrodes 110, the source electrodes 120, and the drain electrodes 122, which are indicated by dotted lines in the drawings before, are omitted for clarity.

The second dielectric layer 160 may include a transparent material through which light passes. Also, the second dielectric layer 160 may include a material through which light having a desired wavelength passes selectively. Also, the second dielectric layer 160 may include an elastic material of which thickness is changed with respect to an external pressure so that pressure sensing can be performed. The second dielectric layer 160 includes rubber, polydimethylsiloxane (PDMS), benzophenone, xylene, ecoflex, nusil, hydrogel, polyurethane, RTV, flaxane, tecothane, nitrile, neoprene, ethylene propylene diene monomer (EPDM), styrene butadiene rubber (SBR), silicone, fluorocarbon viton, polyurethane, and polybutadiene, for example. The second dielectric layer 160 may be formed using various methods such as spin coating, deposition, and the like.

Figure 6:
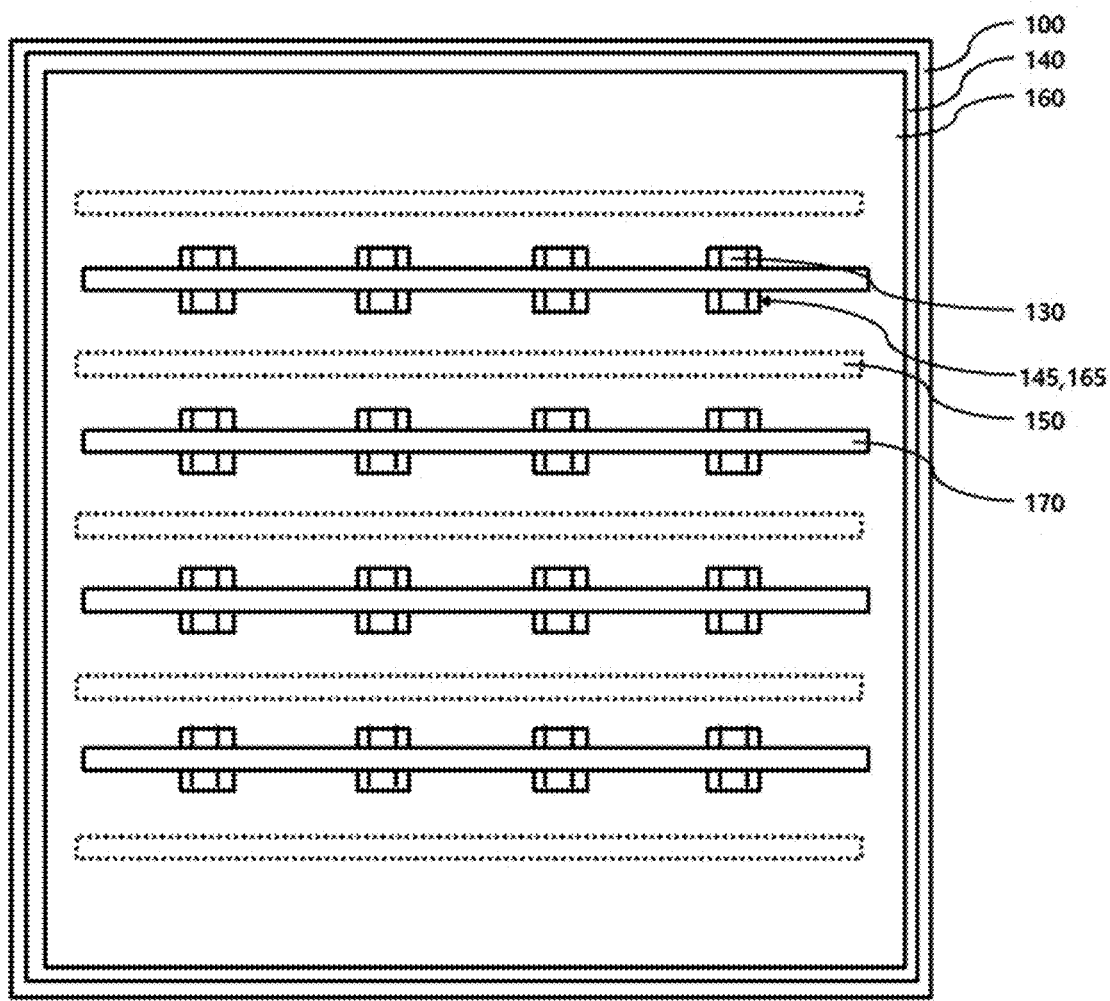

Referring to FIG. 6, gate electrodes 170 are formed on the second dielectric layer 160. The gate electrodes 170 may be disposed on the channel region 130 to correspond to the cannel region 130. Thus, an air layer may be disposed between the channel region 130 and the gate electrodes 170 due to the first openings 145 and the second openings 165. Also, the gate electrodes 170 may be disposed between the second electrodes 150. The gate electrodes 170 may extend in the second direction. The gate electrodes 170 may include a transparent material through which light passes. Also, the gate electrodes 170 may include a material through which light having a desired wavelength passes selectively. The gate electrodes 170 may include ITO, $In_2O_3$, $SnO_2$, graphene, carbon nanotube, metal nanowire, metal nanomesh, metal nanofiber, metal nanotrough, conducting polymer, AgNF, and AgNW, for example. The gate electrodes 170 may include the same material as a material used to form the source electrodes 120 and the drain electrodes 122 or a different material from the material used to form the source electrodes 120 and the drain electrodes 122. Also, the gate electrodes 170 may include a nanostructure that will be described below.

Figure 7:
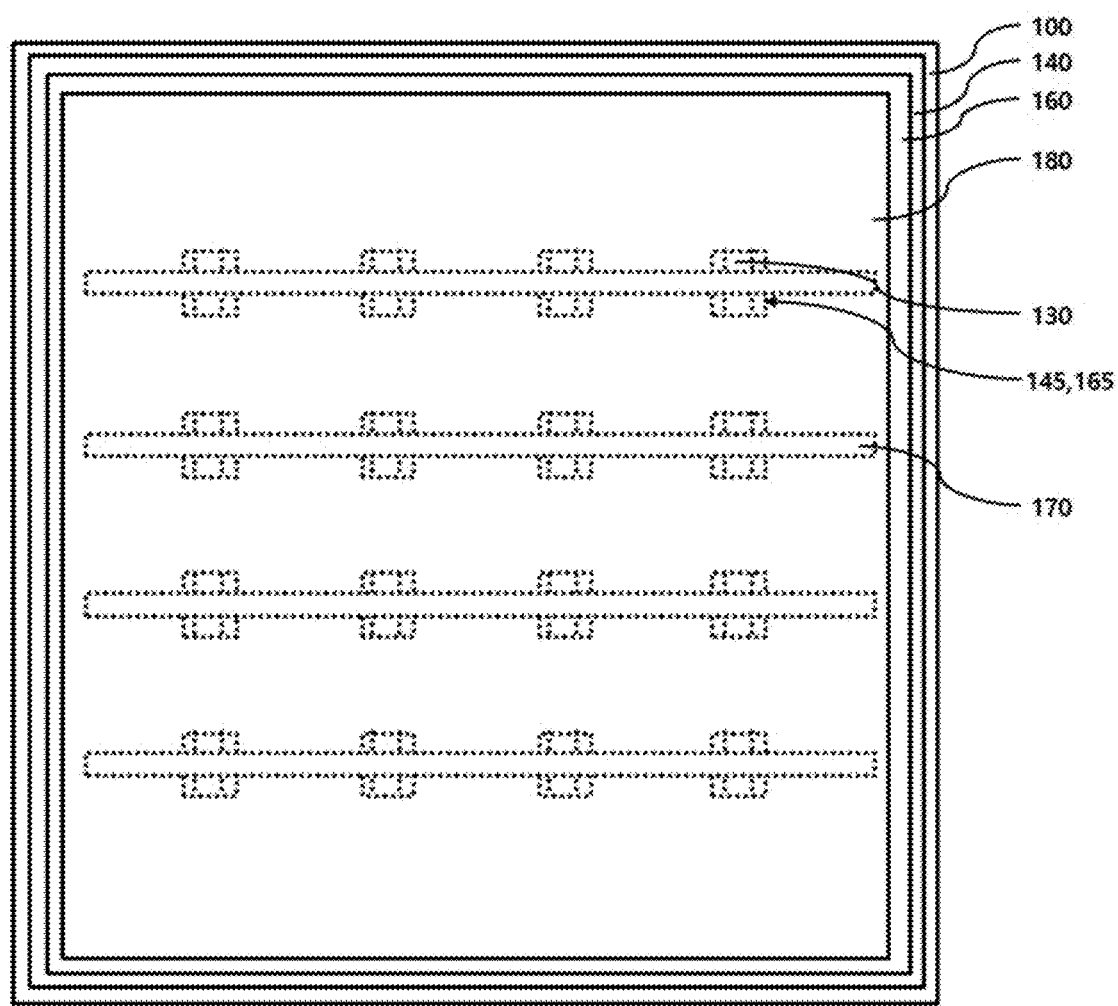

Referring to FIG. 7, a cover layer 180 is formed on the second dielectric layer 160. The cover layer 180 may cover the channel region 130 and the gate electrodes 170 entirely. The cover layer 180 may be disposed on the gate electrodes 170 and may protect the gate electrodes 170 from a contact of a finger print or an external environment. The cover layer 180 may include a transparent material through which light passes. Also, the cover layer 180 may include a material through which light having a desired wavelength passes selectively. The cover layer 180 may include a material that is substantially the same material used to form the first dielectric layer 140. For your reference, the channel region 130 and the gate electrodes 170 are indicated by dotted lines, which means that they are disposed below the cover layer 180, and the second electrodes 150 indicated by the dotted lines in the drawings before are omitted for clarity.

Figure 8:
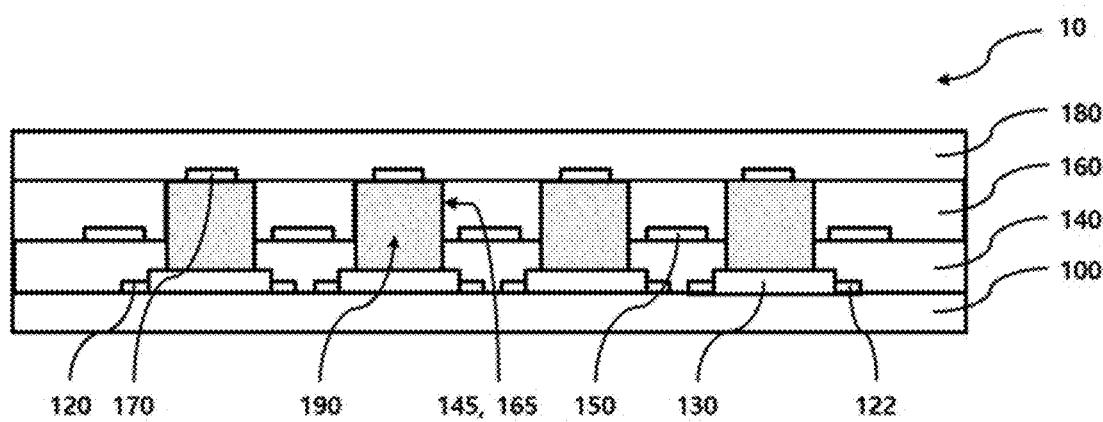
FIG. 8 is a cross-sectional view of the finger print and pressure dual sensor according to an embodiment of the present invention.

FIG. 8 is a cross-sectional view of a finger print and pressure dual sensor 10 according to an embodiment of the present invention.

Referring to FIG. 8, the finger print and pressure dual sensor 10 includes a substrate 100, first electrodes (see 110 of FIG. 1), source electrodes 120, source electrode wirings (see 121 of FIG. 1), drain electrodes 122, drain electrode wirings (see 123 of FIG. 1), a channel region 130, a first dielectric layer 140, second electrodes 150, a second dielectric layer 160, gate electrodes 170, and a cover layer 180.

The first electrodes (see 110 of FIG. 1), the source electrodes 120, the drain electrodes 122, and the channel region 130 are disposed on the substrate 100 to extend in the first direction. Each of the channel regions 130 may be disposed on the substrate 100 and may electrically connect the corresponding source electrode 120 and drain electrode 122 to each other. The first dielectric layer 140 may be disposed on the substrate 100 and may cover the first electrodes 110, the source electrodes 120, the source electrode wirings 121, the drain electrodes 122, the drain electrode wirings 123, and the channel region 130. The whole or a portion of the channel region 130 may be exposed by the first openings 145 provided in the first dielectric layer 140. The second electrodes 150 may be disposed on the first dielectric layer 140 to extend in the second direction. The second dielectric layer 160 may be disposed on the first dielectric layer 140 and may cover the second electrodes 150. The channel region 130 may be exposed by the second openings 165 provided in the second dielectric layer 160. The gate electrodes 170 may be disposed on the second dielectric layer 160 or on the channel region 130 to correspond to the channel region 130. The cover layer 180 may be disposed on the second dielectric layer 160 and cover the gate electrodes 170. A capacitive change layer 190 formed by the first openings 145 and the second openings 165 may be disposed between the channel region 130 and the gate electrodes 170. In the current embodiment, the capacitive change layer 190 may accommodate air.

The finger print and pressure dual sensor 10 according to the technical concept of the present invention may include a finger print sensor unit and a pressure sensor unit. Hereinafter, the structure of the finger print sensor unit and the structure of the pressure sensor unit will be individually described.

Figure 9:
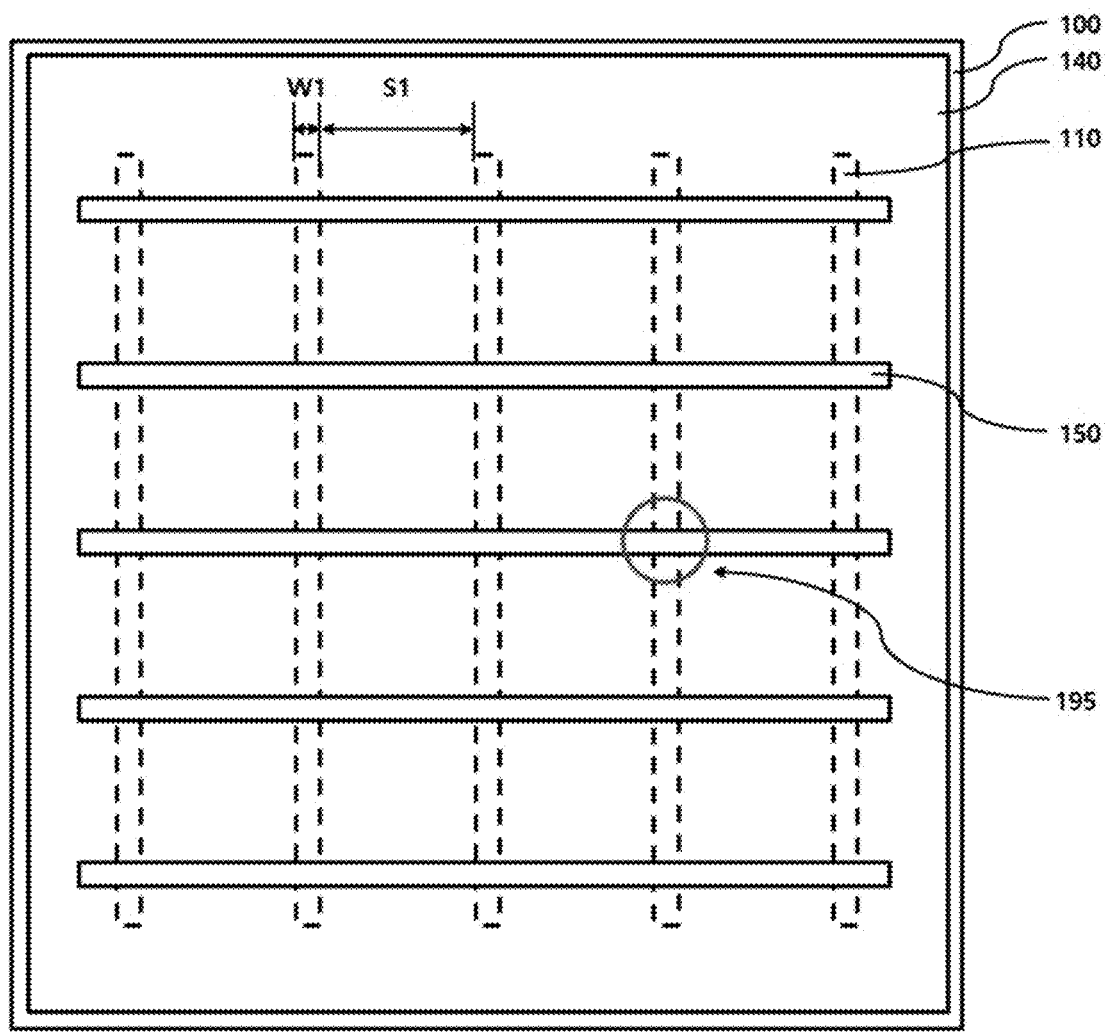
FIG. 9 is a plan view of a finger print sensor unit of the finger print and pressure dual sensor according to an embodiment of the present invention.

FIG. 9 is a plan view of the finger print sensor unit of the finger print and pressure dual sensor 10 according to an embodiment of the present invention. In FIG. 9, elements corresponding to the pressure sensor unit are omitted.

Referring to FIG. 9, the finger print sensor unit may include first electrodes 110, second electrodes 150, and a first dielectric layer 140. The first electrodes 110 and the second electrodes 150 may form a matrix shape. A finger print sensor unit cell 195 is formed in a red circular region in which the first electrodes 110 and the second electrodes 150 cross each other.

At least one of the first electrodes 110 and the second electrodes 150 may satisfy the following dimension. Because a period of a ridge and a valley of a finger print is maximum 150 μm, a width W1 of each of the first electrodes 110 may be greater than 0 μm and be equal to or less than 150 μm. Similarly, each of the second electrodes 150 may have a width that is greater than 0 μm and is equal to less than 150 μm. According to an average period between the ridge and the valley of the finger print, a distance S1 between the first electrodes 110 may be determined. Thus, the distance S1 may be equal to or greater than 2 μm and be equal to or less than 80 μm. Similarly, a distance between the second electrodes 150 may be equal to or greater than 2 μm and be equal to or less than 80 μm. Because the first electrodes 110 may be disposed at a relatively upper side, they may be referred to as upper electrodes, and because the second electrodes 150 may be disposed at a relatively lower side, they may be referred to as lower electrodes.

Figure 10:
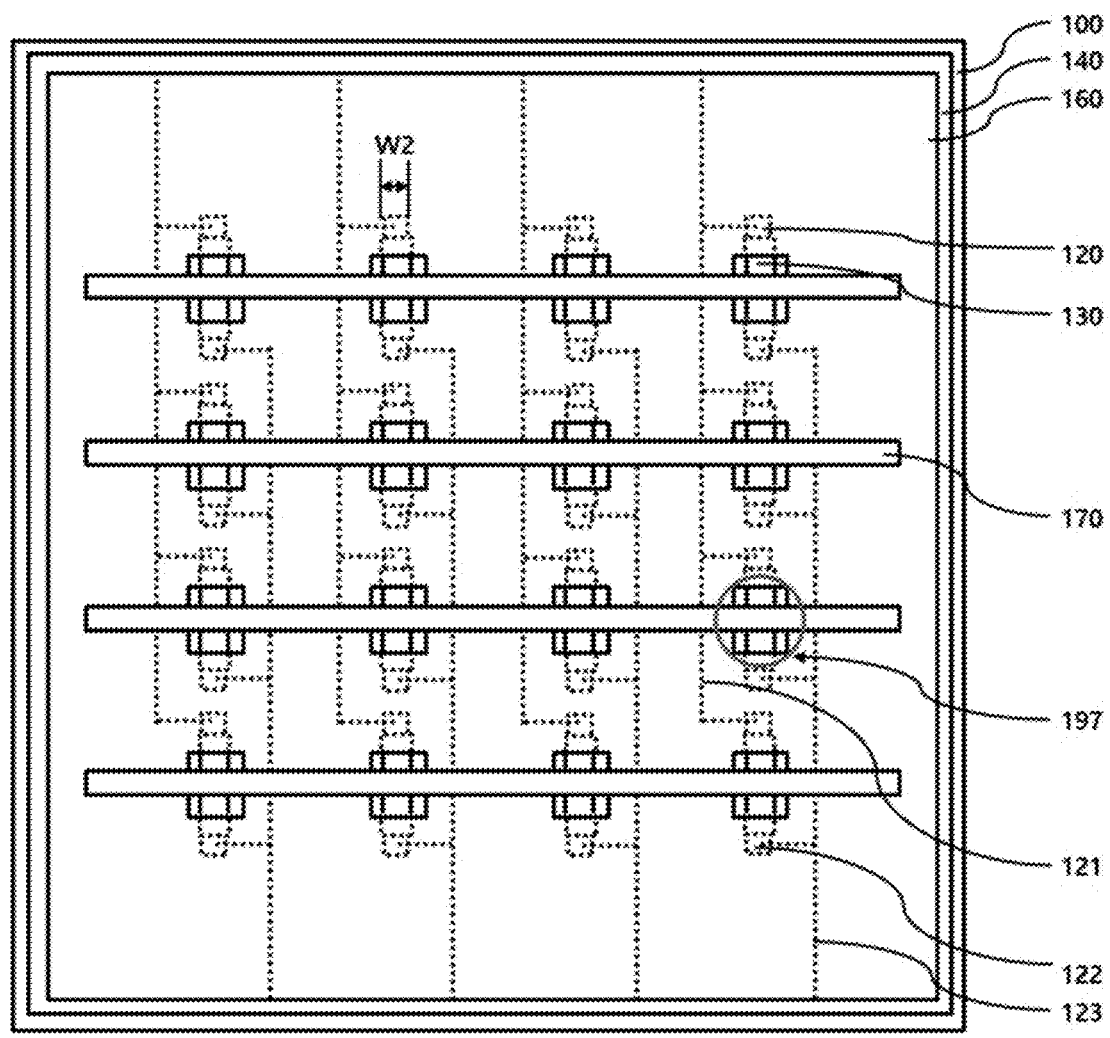
FIG. 10 is a plan view of a pressure sensor unit of the finger print and pressure dual sensor according to an embodiment of the present invention.

FIG. 10 is a plan view of the pressure sensor unit of the finger print and pressure dual sensor 10 according to an embodiment of the present invention. In FIG. 10, elements corresponding to the finger print sensor unit are omitted.

Referring to FIG. 10, the pressure sensor unit may include source electrodes 120, drain electrodes 122, channel regions 130, gate electrodes 170, and a second dielectric layer 160. The channel regions 130 and the gate electrodes 170 may form a matrix shape. A unit pressure sensor cell 197 is formed in a blue circular region in which the channel region 130 and the gate electrodes 170 cross each other.

At least one of the source electrodes 120, the drain electrodes 122, and the gate electrodes 170 may satisfy the following dimension. The source electrodes 120 and the drain electrodes 122 need to be disposed between the first electrodes 110 and the gate electrodes 170 need to be disposed between the second electrodes 150, at least one of the source electrodes 120, the drain electrodes 122, and the gate electrodes 170 may have a width W2 that is greater than 0 μm and is equal to or less than 70 μm. The channel regions 130 may have almost the same width as that of each of the source electrodes 120 and the drain electrodes 122 and may have a width that is greater than 0 μm and is equal to or less than 70 μm, for example. The channel regions 130 may have a length varying according to resolution of a pressure sensor and may have a length that is greater than 0 μm and is equal to or less than 500 μm, for example.

Figure 11:
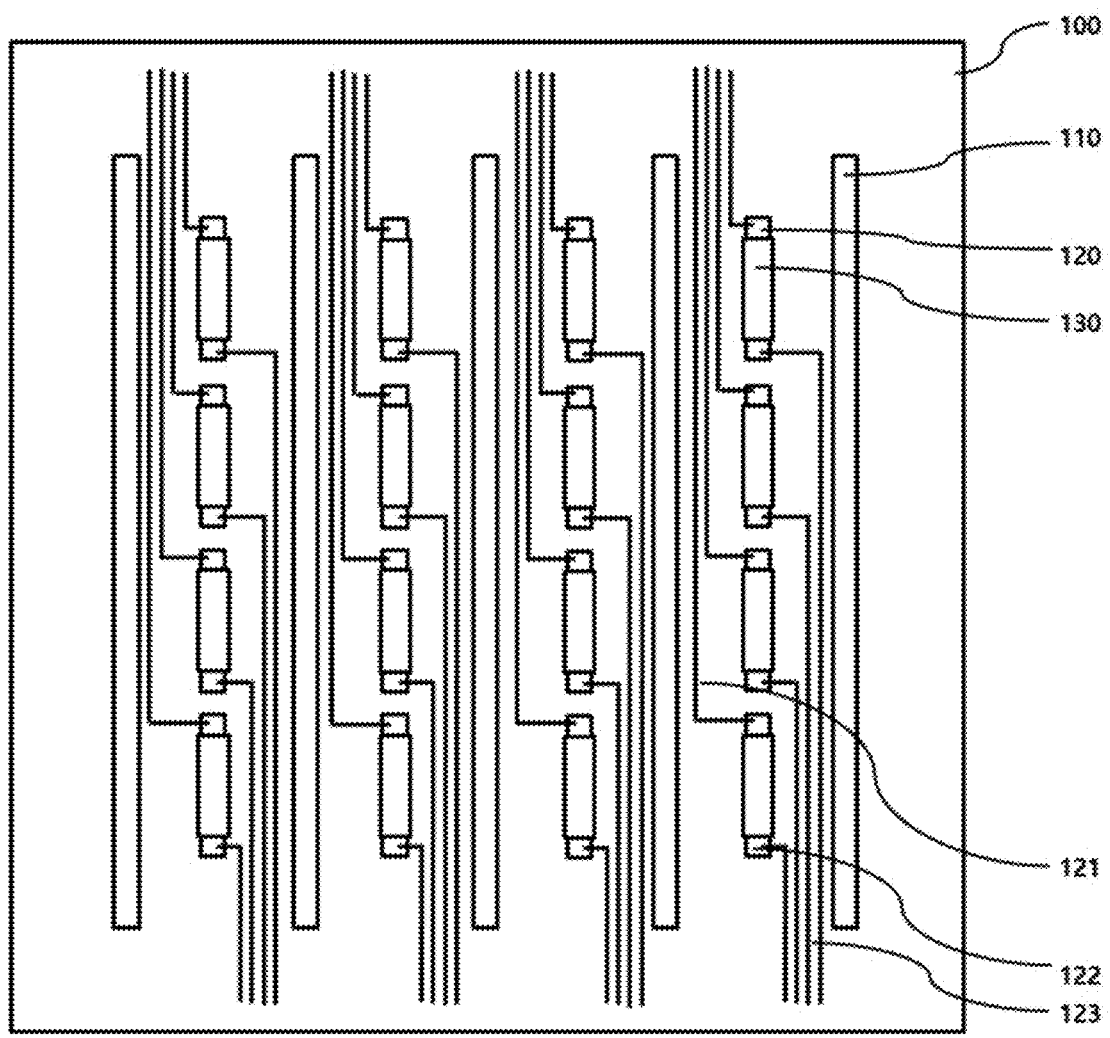
FIG. 11 is a plan view of a source electrode wiring and a drain electrode wiring of the finger print and pressure dual sensor according to an embodiment of the present invention.

FIG. 11 is a plan view of source electrode wirings and drain electrode wirings of the finger print and pressure dual sensor according to an embodiment of the present invention.

Referring to FIG. 11, unlike FIG. 1, the source electrode wirings 121 connected to the source electrodes 120, respectively, are individually connected to the outside, and the drain electrode wirings 123 connected to the drain electrodes 122, respectively, are individually connected to the outside. Forming a finger print and pressure dual sensor according to the manufacturing method described with reference to FIGS. 2 through 7 by including the source electrode wirings 121 and the drain electrode wirings 123 illustrated in FIG. 11 is also included in the technical concept of the present invention.

Hereinafter, an operation of the finger print sensor unit of the finger print and pressure dual sensor 10 according to the technical concept of the present invention will be described.

Figure 12:
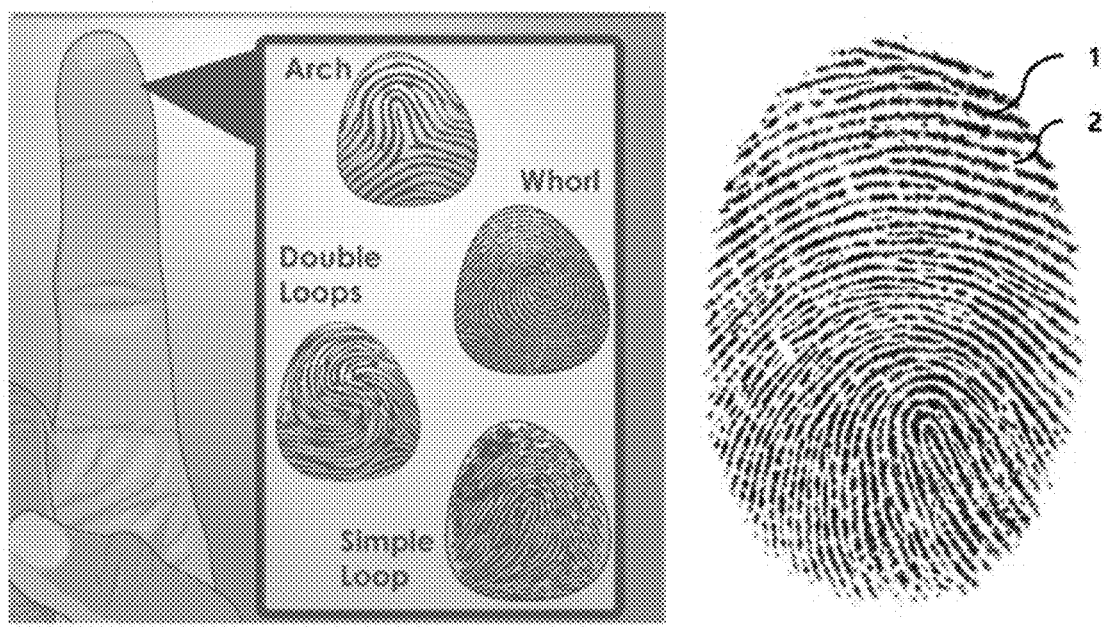
FIG. 12 is a schematic view of a finger print of a human body sensed by the finger print and pressure dual sensor according to an embodiment of the present invention.

FIG. 12 is a schematic view of a finger print of a human body sensed by the finger print and pressure dual sensor according to an embodiment of the present invention.

Referring to FIG. 12, the human body's finger print has different creative finger print patterns. However, the human body's finger print may be classified into an arch type, a whorl type, a simple loop type, and a double loops type according to the shape thereof. These finger prints include a ridge 1 that is a protruding portion, and a valley 2 that is a recessed portion, thereby forming the finger print patterns. In general, the ridge 1 has a width that is equal to or greater than 100 μm and is equal to or less than 400 μm, and the valley 2 has a width that is equal to or greater than 60 μm and is equal to or less than 220 μm. The average of the width of the valley 2 is about 109 μm.

Figure 13:
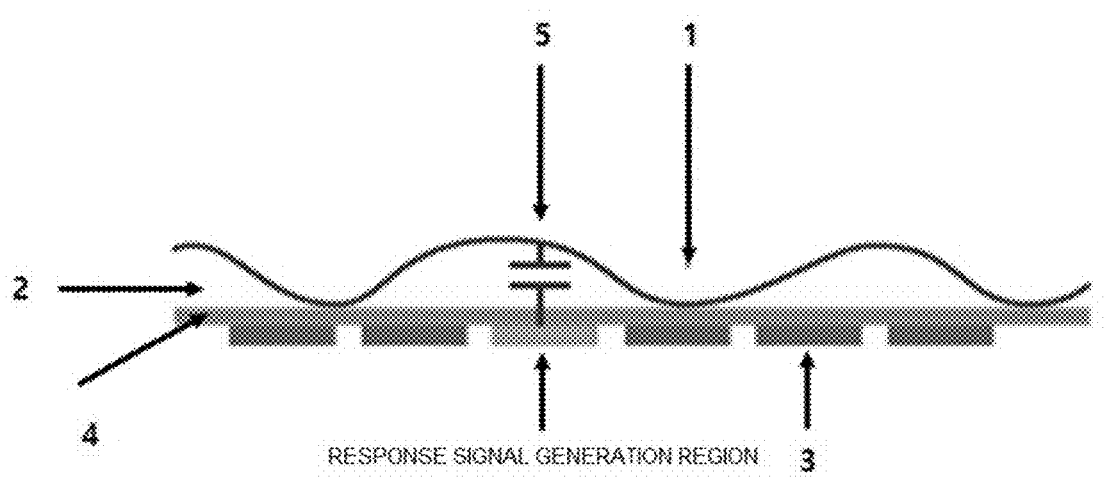
FIG. 13 is a schematic view illustrating a method of driving a finger print sensor of the finger print and pressure dual sensor according to an embodiment of the present invention.

FIG. 13 is a schematic view illustrating a method of driving a finger print sensor of the finger print and pressure dual sensor according to an embodiment of the present invention.

Referring to FIG. 13, when the ridge 1 of the finger print contacts an electrode 3 of the finger print and pressure dual sensor or a protection layer 4 disposed on the electrode 3, a space is formed between the valley 2 of the finger print and the electrode 3. Such a space performs a function of a capacitor 5. Thus, a response signal is generated by the capacitor 5. That is, a region in which the capacitor 5 is formed, is a response signal generation region. In detail, the ridge 1 and the valley 2 are sensed using a capacitance difference caused by a distance difference between the ridge 1 and the valley 2 from the finger print sensor.

Hereinafter, a change in capacitance generated by a contact of the finger print using the finger print sensor unit of the finger print and pressure dual sensor will be described in detail.

Two different capacitances that will be described later need to be considered in case of a thin film capacitor array that constitutes the finger print sensor unit. The two capacitances are a parallel capacitance and a fringing capacitance. The parallel capacitance is a capacitance of a region in which electrodes cross each other, i.e., a finger print sensor unit cell (see 195 of FIG. 9), and the fringing capacitance is a capacitance between edges of the electrode. Thus, the total capacitance is the sum of the parallel capacitance and the fringing capacitance, as shown in the following equation.

$$[\text{parallel capacitance}] \quad [\text{fringing capacitance}] \quad [\text{total capacitance}]$$
$$C = \varepsilon \frac{wl}{d} \quad + \quad C = \frac{\pi \varepsilon l}{\log\left(\frac{4d}{h}\right)} \quad = C = \varepsilon \frac{wl}{d} + \frac{2\pi \varepsilon l}{\log\left(\frac{4d}{h}\right)},$$

where ε is a dielectric constant of a space between electrodes, w is a width of an electrode, l is a length of the electrode, d is a distance between an upper electrode and a lower electrode, and h is a thickness of the electrode.

Figure 14:
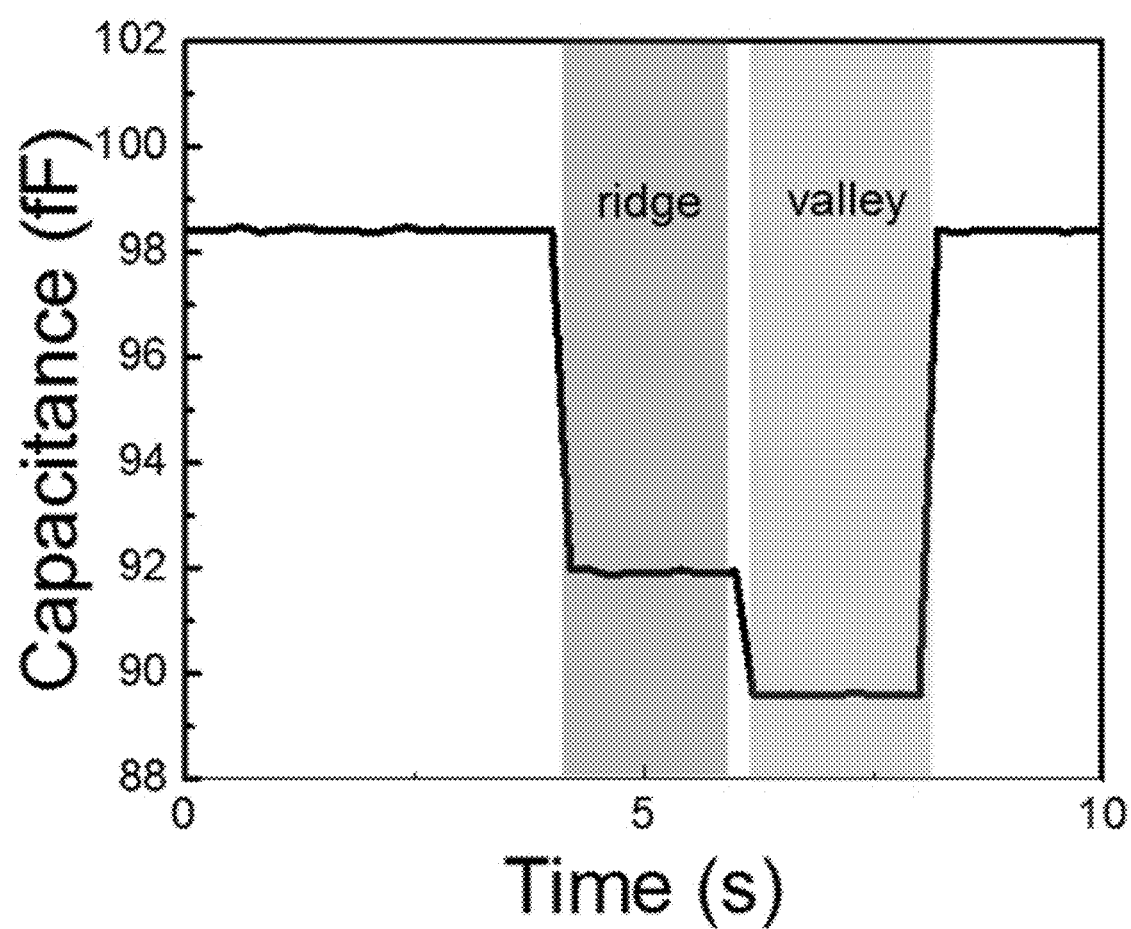
FIG. 14 is a graph showing a change in capacitance when a finger print contacts the finger print sensor unit of the finger print and pressure dual sensor according to an embodiment of the present invention.

FIG. 14 is a graph of a change in capacitance during a contact of a finger print of the finger print sensor unit of the finger print and pressure dual sensor 10 according to an embodiment of the present invention.

Referring to FIG. 14, a change in which capacitance is decreased during a contact of the finger print with the finger print sensor unit of the finger print and pressure dual sensor, is shown. When the ridge or valley of the finger print contacts the finger print sensor unit of the finger print and pressure dual sensor, a reduction in capacitance occurs. A degree of reduction may be equal to or greater than 0.01% and be equal to or less than 50%. In FIG. 14, when the ridge of the finger print contacts the finger print sensor unit of the finger print and pressure dual sensor, a reduction in capacitance is larger than in the case where the valley of the finger print contacts the finger print sensor unit of the finger print and pressure dual sensor. This is just an example, and the case where a reduction in capacitance during a contact of the valley of the finger print with the finger print sensor unit of the finger print and pressure dual sensor is larger than during a contact of the ridge of the finger print with the finger print sensor unit of the finger print and pressure dual sensor, is also included in the technical concept of the present invention.

Hereinafter, an operation of the pressure sensor unit of the finger print and pressure dual sensor 10 according to the technical concept of the present invention will be described.

Figure 15:
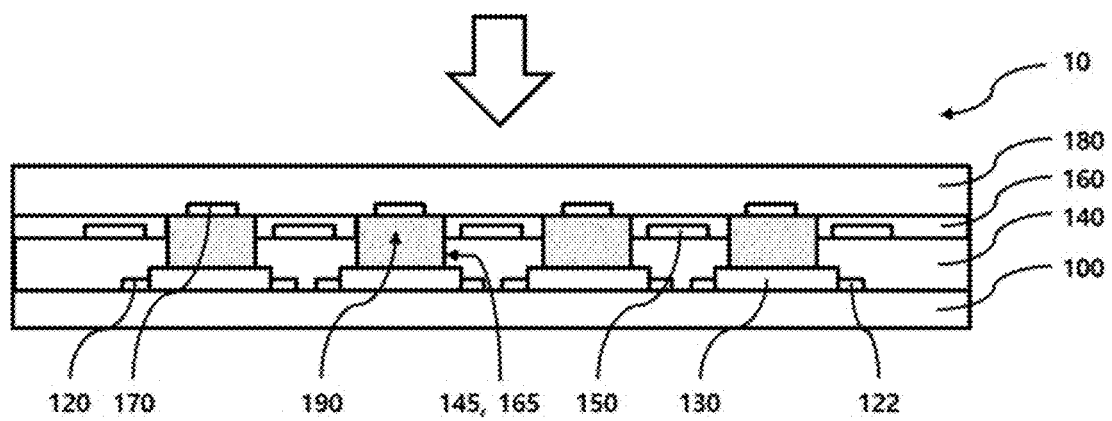
FIG. 15 is a cross-sectional view of an operation of the pressure sensor unit according to pressurization of the finger print and pressure dual sensor of FIG. 8 according to an embodiment of the present invention.

FIG. 15 is a cross-sectional view of an operation of the pressure sensor unit according to pressurization of the finger print and pressure dual sensor 10 of FIG. 8 according to an embodiment of the present invention.

Referring to FIG. 15, when an external pressure (indicated by arrows) is applied to the finger print and pressure dual sensor 10, the thickness of the second dielectric layer 160 is decreased by the external pressure. Thus, the thickness of the capacitive change layer 190 is also decreased. Thus, an electrostatic capacitance of the capacitive change layer 190 is changed so that electrical characteristics of the finger print and pressure dual sensor 10 are changed and thus pressure may be sensed. In detail, the electrostatic capacitance of the capacitive change layer 190 may be changed into electrical signals by using a capacitive sensing circuit including the source electrodes 120, the drain electrodes 122, and the gate electrodes 170. The capacitive sensing circuit is just an example, and the technical concept of the present invention is not limited thereto, and the capacitive sensing circuit may be formed in various circuit patterns.

A plurality of capacitive sensing circuits are arranged to be spaced apart from one another by a predetermined distance in rows and columns in a set region, thereby sensing pressure to the set region. In detail, a degree of a change in electrical characteristics with respect to a change in the thickness of the second dielectric layer 160 according to a degree of the size of force applied to the second dielectric layer 160 during a touch of a finger may be selectively sensed and thus, multi-touch may be performed.

Although the thickness of the second dielectric layer 160 formed of an elastic material varies due to the external pressure, the thickness of the first dielectric layer 140 formed of a hard material may not vary. That is, although the thickness of a region surrounded by the second openings 165 of the capacitive change layer 190 varies, the thickness of a region surrounded by the first openings 145 of the capacitive change layer 190 may not vary. However, this is just an example, and the technical concept of the present invention is not limited thereto.

Meanwhile, the capacitive change layer 190 having a varying electrostatic capacitance according to the external pressure includes air. However, the technical concept of the present invention is not limited thereto. The capacitive change layer 190 may include a dielectric material having a known dielectric constant, and for example, PDMS (Sylgard184; dielectric constant 3), polyimide (dielectric constant 3.4), nusil (EPM2490; dielectric constant 3.4), acetic acid (dielectric constant 6.2), acetone (dielectric constant 20.7), ethanol (dielectric constant 24.3), methanol (dielectric constant 33.1), pyridine (dielectric constant 1.12), and water (dielectric constant 80.4).

The second dielectric layer 160 may include an elastic material having a varying thickness according to the external pressure, as described above, and may have a young's modulus that is equal to or greater than 1 GPa and is equal to or less than 20 GPa. The thickness of the second dielectric layer 160 may be equal to or greater than 0.1 mm and be equal to or less than 5 mm.

The finger print and pressure dual sensor 10 according to the technical concept of the present invention may have the following characteristics.

The finger print and pressure dual sensor 10 may have predetermined transmittance with respect to light, for example, transmittance that is equal to or greater than 60% and is less than 100%, for example, transmittance that is equal to or greater than 70% and is less than 100% with respect to light having a wavelength of 550 nm. Such transmittance may be implemented with a finger print and pressure dual sensor integrated with a display.

Also, the finger print and pressure dual sensor 10 may have a surface resistance that is greater than 0Ω/□ and is equal to or less than 20Ω/□, for example, a surface resistance that is greater than 0Ω/□ and is equal to or less than 10Ω/□. Here, "□" means "square". The surface resistance in this range allows alternating current (AC) driving in high-resolution patterns.

The finger print and pressure dual sensor 10 may have the total capacitance that is equal to or greater than 10 fF and is equal to or less than 500 µF, for example. A finger print sensor unit cell (see 195 of FIG. 9) in which the first, single electrode 110 and the second, single electrode 150 cross each other, may have capacitance that is equal to or greater than 10 fF and is equal to or less than 500 µF, for example. When the value of the capacitance is larger than a value in the range, high-frequency driving may be not possible. In the finger print and pressure dual sensor 10, a reduction that is equal to or greater than 0.01% and is equal to or less than 50% may be represented during a contact of the finger print.

The first dielectric layer 140 may have a thickness that indicates the value of the capacitance, for example, a thickness in the range between 10 nm and 50 µm. The first dielectric layer 140 may have a dielectric constant that is equal to or greater than 2 and is equal to or less than 15, for example.

The cover layer 180 has a significant constant for an increase in sensitivity. The cover layer 180 may have a dielectric constant that is equal to or greater than 4 and is equal to or less than 15, for example. The cover layer 180 may have transmittance that is equal to or greater than 70% and less than 100%, for example. The cover layer 180 may include the same material as or a similar material to that of the first dielectric layer 140.

In order to drive the finger print and pressure dual sensor 10, high-frequency driving is required for noise reduction, and for example, the finger print and pressure dual sensor 10 may have a driving frequency that is equal to or greater than 10 kHz and is equal to or less than 1 MHz, for example, that is equal to or greater than 100 kHz and is equal to or less than 1 MHZ. The finger print and pressure dual sensor 10 may have a change in capacitance that is equal to or greater than 0.01% and is equal to or less than 50% according to the ridge and the valley of the finger print. The finger print and pressure dual sensor 10 may have a driving voltage in the range between 1 and 100 V. The range of the driving voltage is suitable for a use in a wearable device and a smart device.

Hereinafter, a structure and a material used to form electrodes of the finger print and pressure dual sensor according to the technical concept of the present invention will be described in detail. These electrodes may be first electrodes or second electrodes that constitute the finger print sensor unit, or source electrodes, drain electrodes or gate electrodes that constitute the pressure sensor unit.

Figure 16:
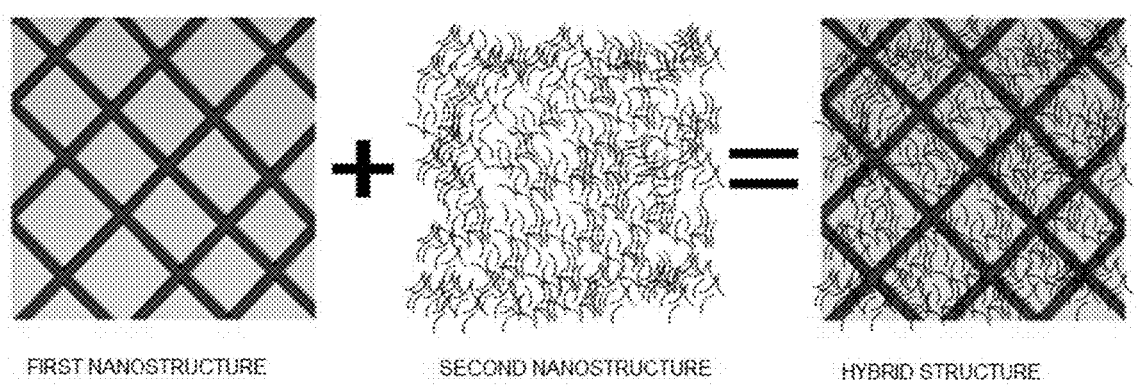
FIG. 16 is a view for explaining a method of forming electrodes that constitute the finger print and pressure dual sensor according to an embodiment of the present invention.

FIG. 16 is a view for explaining a method of forming electrodes that constitute the finger print and pressure dual sensor according to an embodiment of the present invention.

Referring to FIG. 16, the electrodes include a hybrid structure formed by combining a first nanostructure having a first diameter and a second nanostructure having a second diameter smaller than the first diameter. The first nanostructure forms a main conduction path, and the second nanostructure is disposed in an empty space formed by the first nanostructure and electrically connects the first nanostructures to each other, thereby providing an auxiliary conduction path. Also, when fine patterns are formed so that the conduction path of the first nanostructure is opened, the conduction path may be provided by the second nanostructure.

The first nanostructure may have the first diameter that is equal to or greater than 100 nm and is equal to or less than 10 μm, for example. The first nanostructure may include a material having conductivity, for example, a metal, such as silver (Ag), gold (Au), aluminum (Al), copper (Cu), chrome (Cr), nickel (Ni), iron (Fe), or the like. The first nanostructure may be formed using a coaxial electrical radiation method or a nano trot method.

The second nanostructure may have the second diameter that is equal to or greater than 10 nm and is equal to or less than 100 nm. The second nanostructure may include a material having conductivity, for example, a metal, such as Ag, Au, Al, Cu, Cr, Ni, Fe, or the like. The first nanostructure and the second nanostructure may include the same material or different materials. The second nanostructure may be formed using a method such as spin coating, air spray, electrical spray, bar coating, or the like.

Because two-dimensional electrodes such as metal electrodes or indium tin oxide transparent electrodes have a larger parallel capacitance than a fringing capacitance, there is a limitation in forming the shape of electrode patterns in various ways so as to increase contact sensitivity. However, when the finger print and pressure dual sensor according to the technical concept of the present invention forms one-dimensional electrodes including first electrodes and second electrodes, i.e., linear electrodes, a fringing capacitance can be maximized so that high contact sensitivity can be implemented using simple linear patterns instead of forming the conventional complicated patterns.

Because it is difficult to form high-resolution patterns when electrodes are formed of only the first nanostructure and when electrodes are formed of only the second nanostructure, the electrodes have high resistance, it is difficult to drive the finger print and pressure dual sensor at a high frequency of 10 kHz or higher, for example, 100 kHz or higher. In the finger print and pressure dual sensor according to the technical concept of the present invention, as the finger print and pressure dual sensor has the first nanostructure and the second nanostructure, the fringing capacitance can be increased, and high-frequency driving can be performed. Also, a mesh structure may be formed by adjusting the ratio of the first nanostructure with respect to the second nanostructure. Thus, the fringing capacitance may be maximized.

Figure 17:
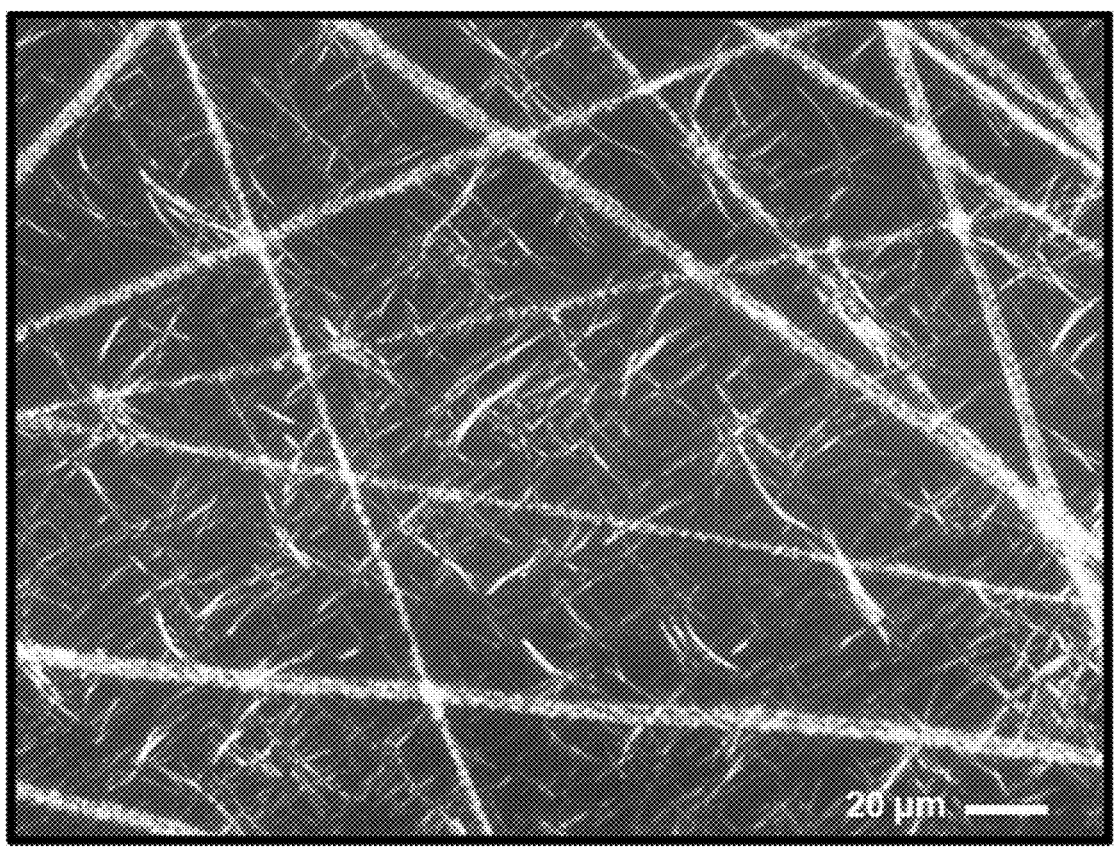
FIG. 17 is a scanning electron microscope (SEM) image of electrodes that constitute the finger print and pressure dual sensor according to an embodiment of the present invention.

FIG. 17 is a scanning electron microscope (SEM) image of electrodes that constitute the finger print and pressure dual sensor according to an embodiment of the present invention.

Referring to FIG. 17, in electrodes that constitute the finger print and pressure dual sensor, the first nanostructure and the second nanostructure as described in FIG. 16 are shown. The first nanostructure and the second nanostructure include Ag. The finger print and pressure dual sensor has transmittance of 88% at 550 nm and has a surface resistance of 1.61±0.1 Ω/□.

Hereinafter, in manufacturing of electrodes that constitute the finger print and pressure dual sensor, a change in characteristics according to a spin coating time when a first nanostructure is primarily formed and then a second nanostructure is formed by spin coating has been analyzed. As the spin coating time is increased, the quantity of the second nanostructure is increased.

Figure 18:
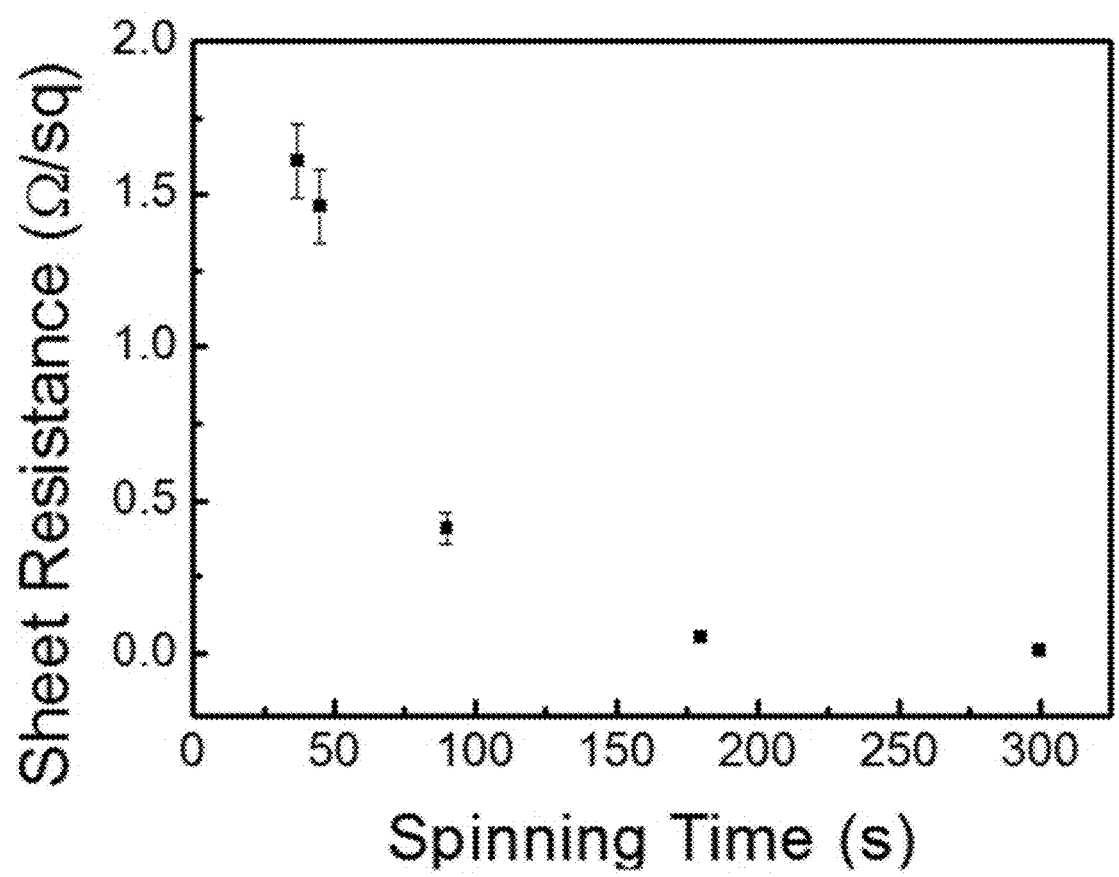
FIG. 18 is a graph of a change in surface resistance according to a spin coating time of electrodes that constitute the finger print and pressure dual sensor according to an embodiment of the present invention.

FIG. 18 is a graph is a change in surface resistance according to a spin coating time of electrodes that constitute the finger print and pressure dual sensor according to an embodiment of the present invention.

Referring to FIG. 18, in spin coating for 40 seconds, a surface resistance of 1.61±0.1Ω/□ was shown, and as the spin coating time was increased, the surface resistance was reduced. In the range of a spin coating time within approximately 100 seconds, a reduction in the surface resistance occurred rapidly, and in a spin coating time after 100 seconds, a reduction in the surface resistance occurred gently.

Figure 19:
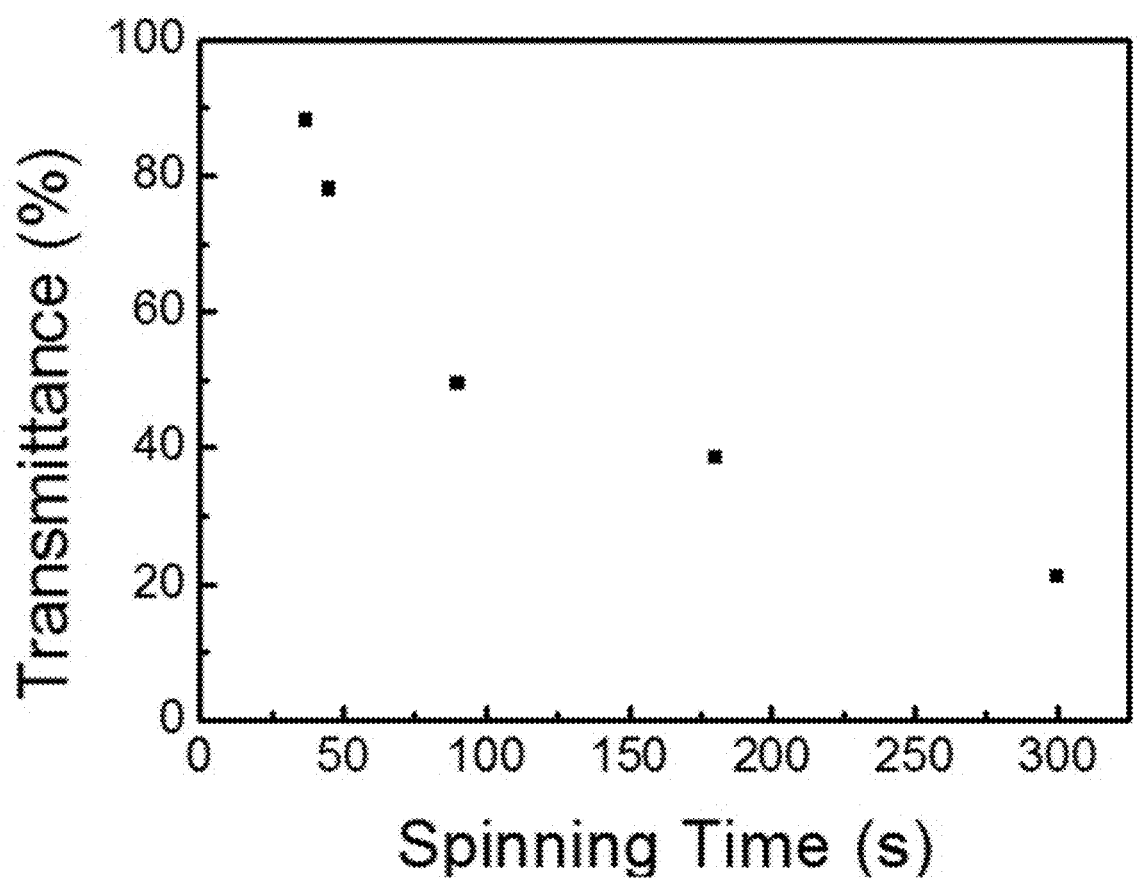
FIG. 19 is a graph of a change in transmittance according to a spin coating time of electrodes that constitute the finger print and pressure dual sensor according to an embodiment of the present invention.

FIG. 19 is a graph of a change in transmittance according to a spin coating time of electrodes that constitute the finger print and pressure dual sensor according to an embodiment of the present invention.

Referring to FIG. 19, in electrical radiation for 40 seconds, transmittance of 88% with respect to 550 nm was shown, and as an electrical radiation time was increased, transmittance was reduced. In the range of an electrical radiation time within approximately 100 seconds, a reduction in the surface resistance occurred rapidly, and in an electrical radiation time after 100 seconds, a reduction in the surface resistance occurred gently.

Table 1 shows characteristics of electrodes that constitute the finger print and pressure dual sensor according to an embodiment of the present invention.

TABLE 1

|  | Surface resistance (Ω/□) | Transmittance (%) | Maximum line width (μm) | Whether high-frequency driving can be performed | Change in capacitance during contact of finger print |
|---|---|---|---|---|---|
| First nanostructure | 3 | 90 | 200 | X | X |
| Second nanostructure | 30 | 90 | 20 | X | X |
| Hybrid structure | 30 | 98 | 50 | X | X |
| Hybrid structure | 20 | 94 | 50 | ○ | 8% |
| Hybrid structure | 10 | 93 | 50 | ○ | 9% |
| Hybrid structure | 1.2 | 88 | 50 | ○ | 15% |
| Hybrid structure | 1.1 | 85 | 50 | ○ | 15% |
| Hybrid structure | 0.9 | 73 | 50 | ○ | 16% |
| Hybrid structure | 0.8 | 65 | 50 | ○ | 12% |
| Hybrid structure | 0.7 | 55 | 50 | ○ | 9% |
| Hybrid structure | 0.5 | 49 | 50 | ○ | 6% |
| Hybrid structure | 0.05 | 38 | 50 | ○ | 4% |
| Hybrid structure | 0.012 | 21 | 50 | ○ | 3% |

Referring to Table 1, when a hybrid structure is formed according to the technical concept of the present invention, a surface resistance may be reduced compared to 30Ω/□ in the case where the finger print and pressure dual sensor includes only the second nanostructure, and furthermore, a surface resistance may be reduced compared to 3Ω/□ in the case where the finger print and pressure dual sensor includes only the first nanostructure. It is analyzed that this is because the content of the second nanostructure is increased, the second nanostructure is disposed in an empty space formed by the first nanostructure, thereby providing an enlarged conduction path. However, it will be noted that, as the second nanostructure is increased, a reduction in transmittance occurs.

Thus, optimum conditions can be drawn based on transmittance of 60% or more, a surface resistance of 20Ω/□ or less, and a change in capacitance of 7% or more according to a contact of a finger print. Thus, it is analyzed that driving of the finger print and pressure dual sensor can be performed in the range of the ratio of the second nanostructure with respect to the first nanostructure of 10:90 to 90:10, for example, 30:70 to 90:10. The range may be drawn by analyzing a distribution of shapes of the first nanostructure and the second nanostructure using a microscope in terms of electrodes that constitute the finger print and pressure dual sensor.

Figure 20:
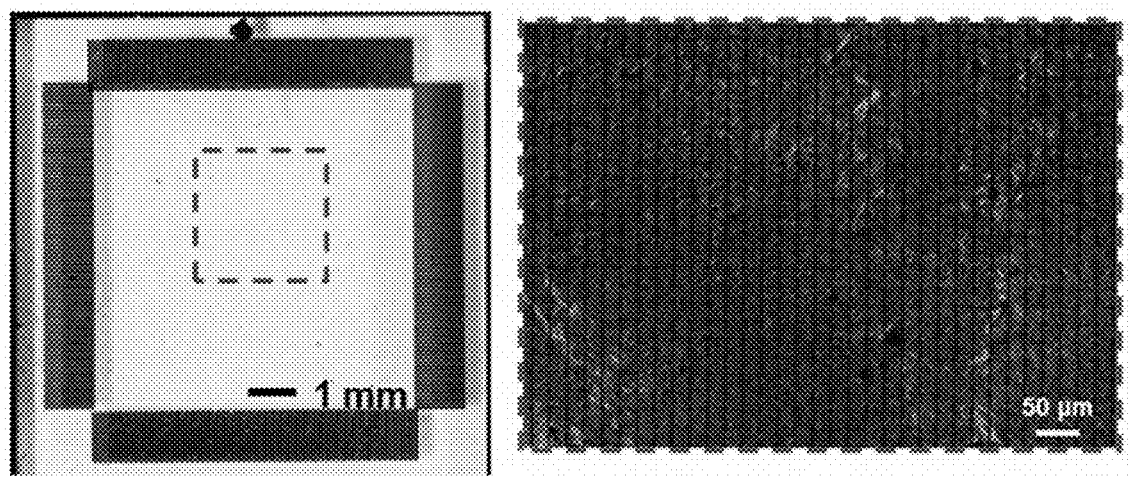
FIG. 20 is a photo of the finger print and pressure dual sensor according to an embodiment of the present invention.
Figure 21:
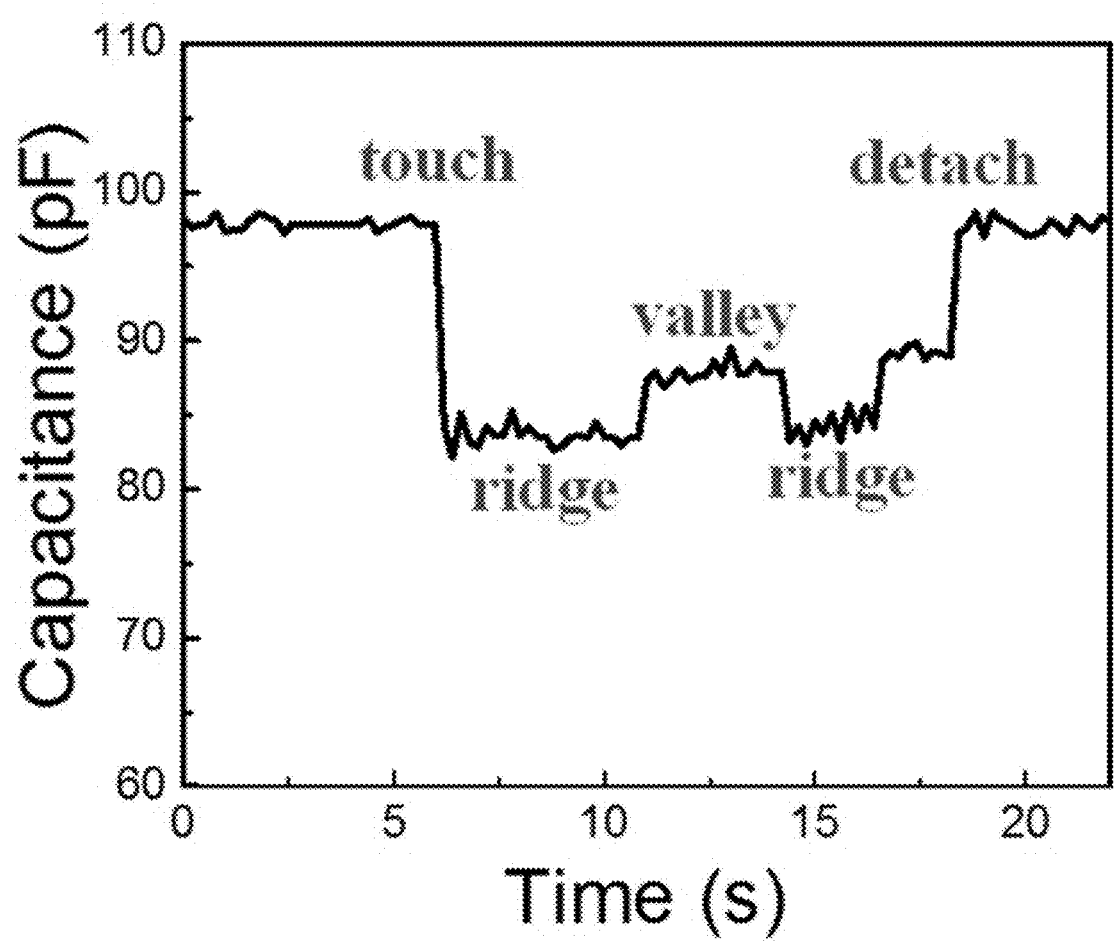
FIG. 21 is a graph of a change in capacitance during a contact of a finger print measured using the finger print and pressure dual sensor of FIG. 20.

FIG. 20 is a photo of the finger print and pressure dual sensor according to an embodiment of the present invention. FIG. 21 is a graph of a change in capacitance during a contact of a finger print measured using the finger print and pressure dual sensor of FIG. 20.

Referring to FIGS. 20 and 21, a transparent finger print and pressure dual sensor in which transparent linear electrodes crossed one another, was manufactured. A change in capacitance when a ridge and a valley of a finger print contacted each other at a frequency of 150 kHz while a finger was moved at a voltage of 3 V was ascertained. As a capacitance value is changed when the ridge and the valley of the finger print contact each other, the finger print and pressure dual sensor has high sensitivity.

Figure 22:
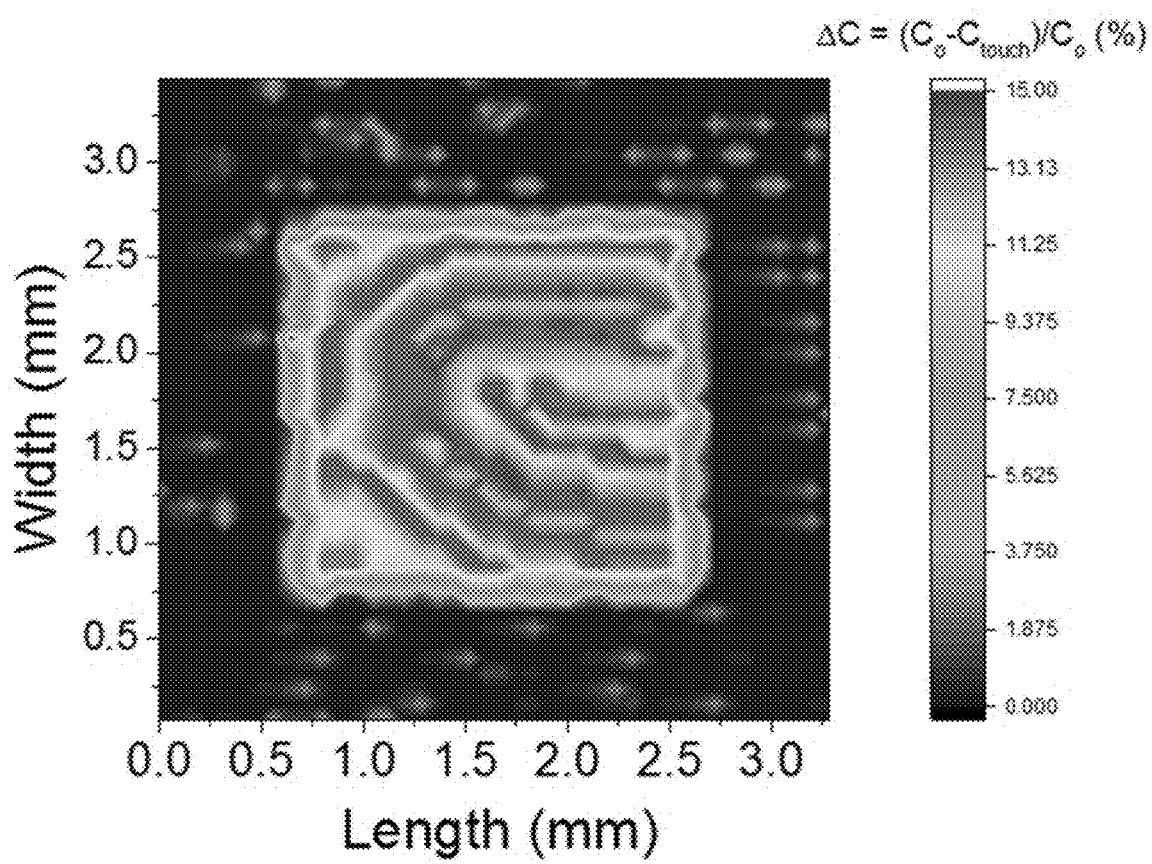
FIG. 22 is an image showing a change in capacitance during a contact of a finger print with respect to the entire area of the finger print and pressure dual sensor according to an embodiment of the present invention.

FIG. 22 is an image showing a change in capacitance during a contact of a finger print with respect to the entire area of the finger print and pressure dual sensor according to an embodiment of the present invention.

Referring to FIG. 22, because shapes of the ridge and the valley of the finger print are clearly shown with different colors that indicate different capacitance values, the finer print and pressure dual sensor has high sensitivity.

Figure 23:
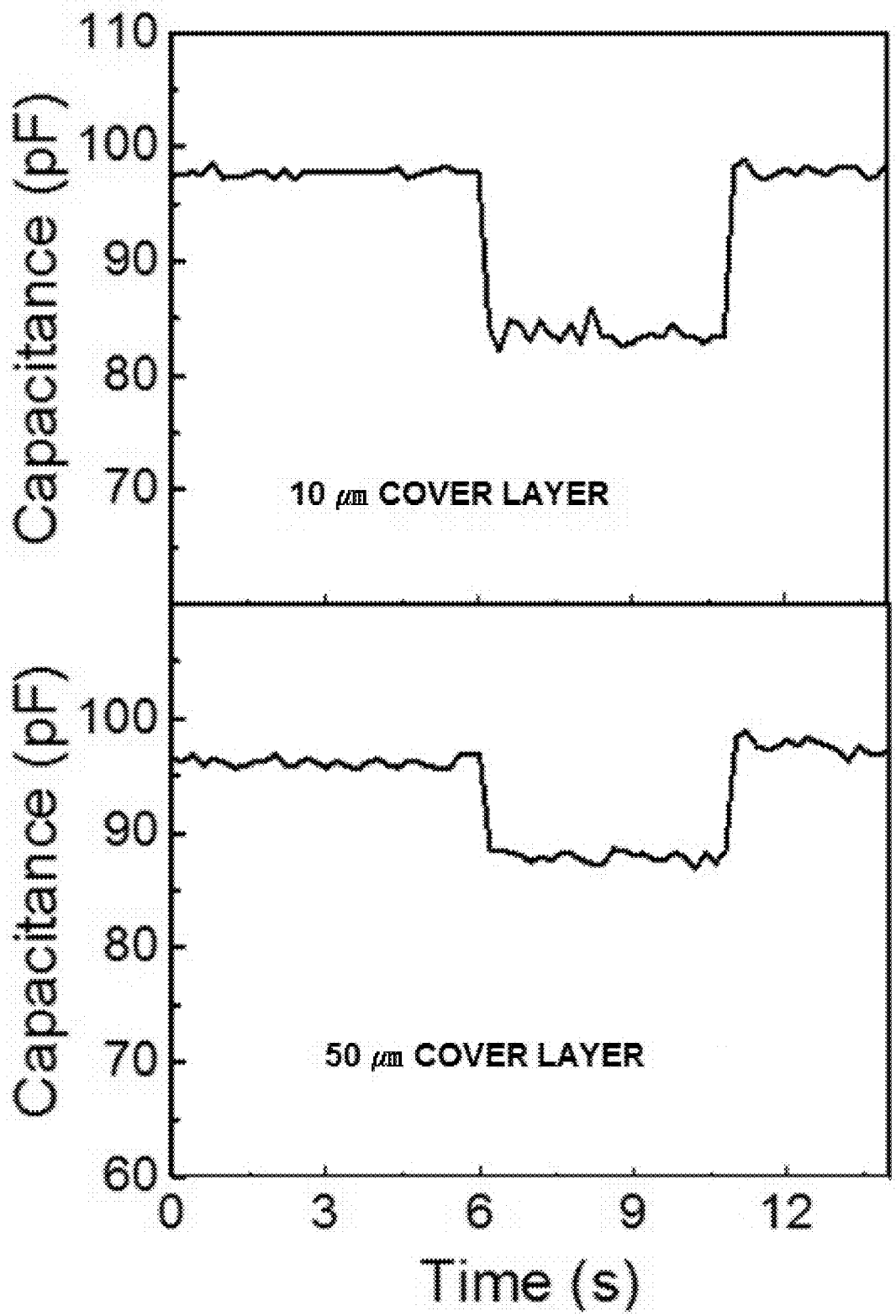
FIG. 23 is a graph of a change in capacitance with respect to the thickness of a cover layer of the finger print and pressure dual sensor according to an embodiment of the present invention.

FIG. 23 is a graph of a change in capacitance with respect to the thickness of a cover layer of the finger print and pressure dual sensor according to an embodiment of the present invention.

Referring to FIG. 23, as the thickness of a cover layer is increased, a change in capacitance is reduced.

Table 2 shows mobility according to an external pressure of the finger print and pressure dual sensor according to an embodiment of the present invention. Unit is $cm^2/Vs$.

TABLE 2

|  | 0 kPa | 62 kPa | 131 kPa | 187 kPa | 250 kPa |
|---|---|---|---|---|---|
| p-type | 168000 | 166000 | 70000 | 48000 | 28000 |
| n-type | 198000 | 326000 | 350000 | 327000 | 310000 |

Referring to Table. 2, in the case of a p-type, mobility is reduced according to pressure, whereas, in the case of an n-type, when pressure is applied to the finger print and pressure dual sensor, mobility is increased.

Figure 24:
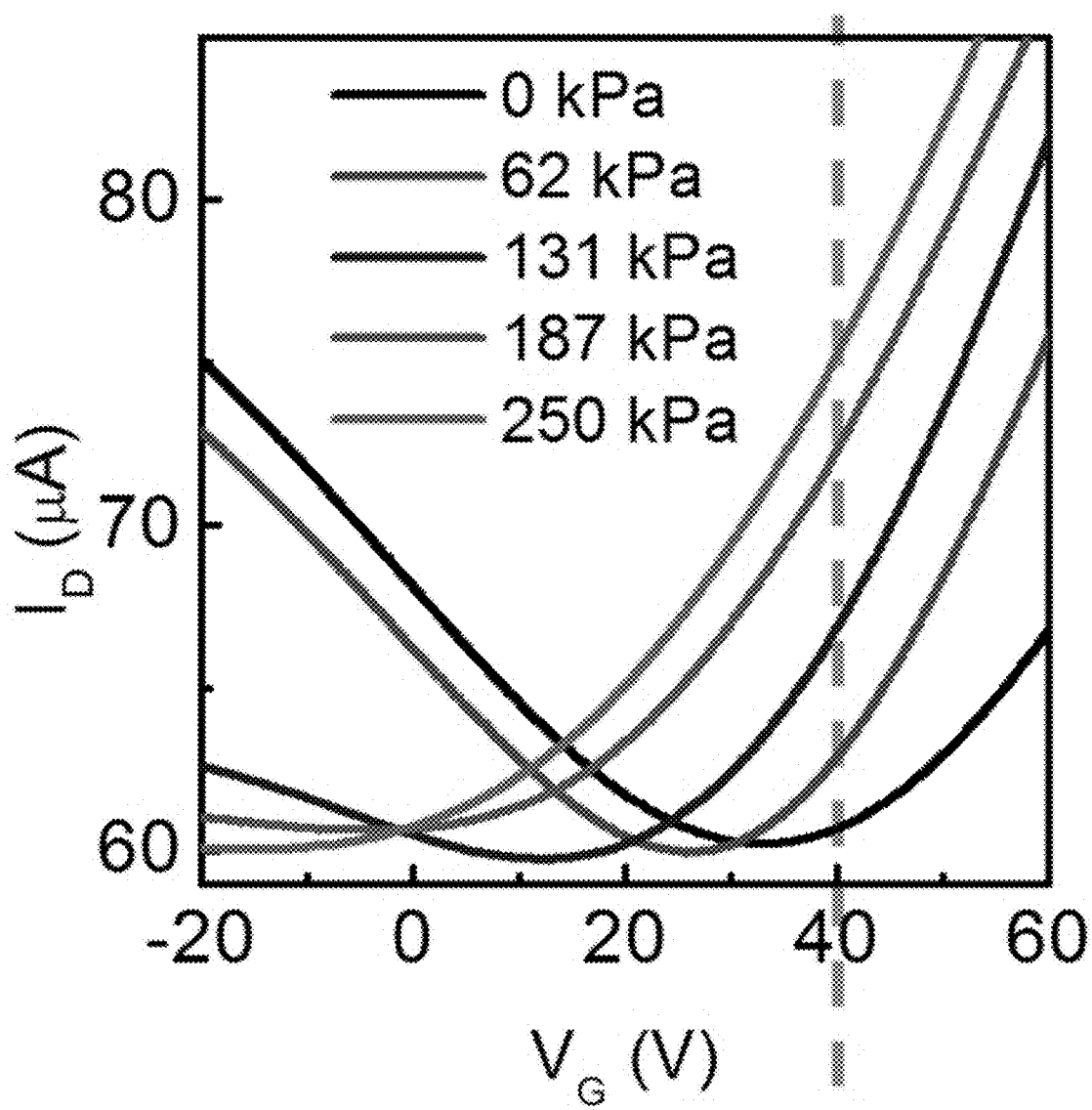
FIG. 24 is a graph showing the relationship between a gate voltage and a drain current with respect to an external pressure of the finger print and pressure dual sensor according to an embodiment of the present invention.

FIG. 24 is a graph showing the relationship between a gate voltage and a drain current with respect to an external pressure of the finger print and pressure dual sensor according to an embodiment of the present invention. In FIG. 24, a drain voltage is 0.1 V.

Referring to FIG. 24, as the external pressure is increased, a graph is moved to the left.

Figure 25:
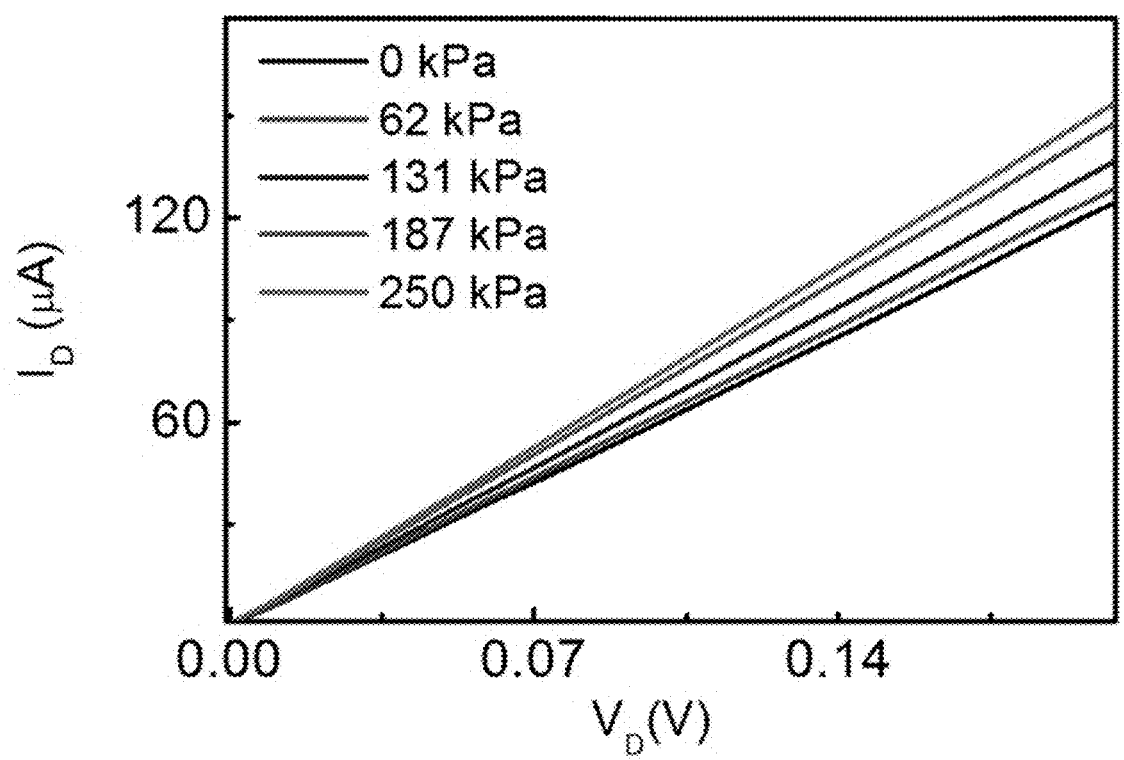
FIG. 25 is a graph of a drain voltage and a drain current with respect to an external pressure of the finger print and pressure dual sensor according to an embodiment of the present invention.

FIG. 25 is a graph of a drain voltage and a drain current with respect to an external pressure of the finger print and pressure dual sensor according to an embodiment of the present invention. In FIG. 25, the gate voltage is 40 V.

Referring to FIG. 25, as the external pressure is increased, a graph is moved upwards so that an inclination is increased.

Electrical characteristics of a transistor, i.e., including source electrodes, drain electrodes, and gate electrodes, which constitutes a pressure sensing unit according to the external pressure are changed according to the results of FIGS. 24 and 25 so that pressure sensing may be performed.

A finger print and pressure dual sensor according to the technical concept of the present invention includes a finger print sensor unit and a pressure sensor unit simultaneously, thereby performing finger print sensing and pressure sensing simultaneously.

First linear electrodes and second linear electrodes that constitute the finger print sensor unit are configured in a matrix manner in which they cross each other. A channel region and a gate electrode that constitute the pressure sensor unit are configured in a matrix manner in which they cross each other. Each of the first electrodes and the second electrodes includes a first nanostructure and a second nanostructure having different diameters. At least one of source electrodes, drain electrodes, and the gate electrodes includes the above-described first nanostructure and second nanostructure. The first nanostructure forms a main conduction path, and the second nanostructure is disposed in an empty space formed by the first nanostructure and electrically connects the first nanostructures to each other, thereby providing an auxiliary conduction path. Thus, electrodes having a mesh structure according to the related art can be prevented from being opened. Thus, uniform and improved electrical characteristics can be provided.

In addition, a first dielectric material disposed at a lower side includes a hard material, thereby preventing damage of the second electrodes, and a second dielectric material disposed at an upper side includes an elastic material, and the thickness of the second dielectric material is changed with respect to the external pressure so that the thickness of a capacitive change layer between the channel region and the gate electrodes is changed and thus pressure can be sensed through a change in electrical characteristics.

In addition, in the finger print and pressure dual sensor, fringing capacitance is improved with respect to a limitation of use in the range of a high frequency for noise reduction according to the shape of a matrix so that sensitivity of finger print sensing can be improved. In addition, because the finger print and pressure dual sensor may have flexibility that cannot be provided by the conventional indium tin oxide due to the use of a nanostructure, the finger print and pressure dual sensor can be used as a security method in various mobile devices and thus can be applied to wearable electronic devices. A home button can be completely replaced by an integrated finger print and pressure dual sensor.

The above-described effects of the present invention are illustratively described, and the scope of the invention is not limited by these effects.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A finger print and pressure dual sensor comprising:
    first electrodes disposed on a substrate and extending in a first direction, and source electrodes and drain electrodes disposed to face each other in the first direction;
    channel regions disposed on the substrate and electrically connected to the corresponding source electrode and drain electrode;
    a first dielectric layer disposed on the substrate, covering the first electrodes, the source electrodes, and the drain electrodes and having first openings for exposing the channel region;
    second electrodes disposed on the first dielectric layer and extending in a second direction;
    a second dielectric layer disposed on the first dielectric layer, covering the second electrodes and having second openings for exposing the channel region;
    gate electrodes disposed on the second dielectric layer, extending in the second direction and disposed on the channel region so as to correspond to the channel region; and
    a cover layer disposed on the second dielectric layer and covering the gate electrodes.

2. The finger print and pressure dual sensor of claim 1, further comprising a capacitive change layer formed by the first openings and the second openings and disposed between the channel region and the gate electrodes.

3. The finger print and pressure dual sensor of claim 2, wherein the second dielectric layer includes an elastic material, and a thickness of the second dielectric layer is changed by an external pressure so that a capacitance of the capacitive change layer is changed and thus the external pressure is sensed.

4. The finger print and pressure dual sensor of claim 2, wherein the capacitive change layer includes air, polydimethylsiloxane (PDMS), polyimide, nusil, acetic acid, ethanol, methanol, pyridine, or water.

5. The finger print and pressure dual sensor of claim 1, wherein the second dielectric layer has an elastic factor that is equal to or greater than 1 GPa and is equal to or less than 20 GPa and a thickness that is equal to or greater than 0.1 mm and is equal to or less than 5 mm.

6. The finger print and pressure dual sensor of claim 1, wherein the first dielectric layer includes a hard material, and a thickness of the first dielectric layer is not changed by an external pressure.

7. The finger print and pressure dual sensor of claim 1, wherein the first dielectric layer has a dielectric constant that is equal to or greater than 2 and is equal to or less than 15 and a thickness in the range between 10 nm and 50 μm.

8. The finger print and pressure dual sensor of claim 1, wherein the source electrodes, the drain electrodes, and the channel region are disposed between the first electrodes, and the gate electrodes are disposed between the second electrodes.

9. The finger print and pressure dual sensor of claim 1, wherein the source electrodes and the drain electrodes include the same material as a material used to form the first electrodes.

10. The finger print and pressure dual sensor of claim 1, wherein each of the first electrodes has a width that is greater than 0 μm and is equal to or less than 150 μm, a distance that is equal to or greater than 2 μm and is equal to or less than 50 μm, transmittance that is equal to or greater than 70% and is less than 100% with respect to light having a wavelength of 550 nm, a surface resistance that is greater than 0Ω/□ and is equal to or less than 20Ω/□, and capacitance that is equal to or greater than 10 fF and is equal to or less than 500 μF, and during a contact of a finger print, a reduction in the capacitance that is equal to or greater than 0.01% and is equal to or less than 50% is shown.

11. The finger print and pressure dual sensor of claim 1, wherein each of the second electrodes has a width in a range between 0 and 150 μm and a distance in a range between 2 and 50 μm.

12. The finger print and pressure dual sensor of claim 1, wherein a finger print sensor unit cell configured when the first, single electrode and the second, single electrode cross each other, has a capacitance in a range between 10 fF and 500 μF.

13. The finger print and pressure dual sensor of claim 1, wherein the cover layer has a dielectric constant that is equal to or greater than 4 and is equal to or less than 15 and transmittance that is equal to or greater than 70% and is less than 100%.

14. The finger print and pressure dual sensor of claim 1, wherein at least one of the first electrodes, the second electrodes, the source electrodes, the drain electrodes, and the gate electrodes comprises a hybrid structure formed by combining a first nanostructure having a first diameter and a second nanostructure having a smaller second diameter than the first diameter.

15. The finger print and pressure dual sensor of claim 14, wherein the first nanostructure has the first diameter that is equal to or greater than 100 nm and is equal to or less than 10 μm, and the second nanostructure has the second diameter that is equal to or greater than 10 nm and is equal to or less than 100 nm.

16. The finger print and pressure dual sensor of claim 14, wherein the first nanostructure forms a main conduction path, and the second nanostructure is disposed in an empty space formed by the first nanostructure and electrically connects the first nanostructures to each other, thereby providing an auxiliary conduction path.

17. The finger print and pressure dual sensor of claim 14, wherein, when a conduction path of the first nanostructure is opened, a conduction path is provided by the second nanostructure.

18. The finger print and pressure dual sensor of claim 14, wherein a ratio of the first nanostructure with respect to the second nanostructure is 10:90 to 90:10.

19. The finger print and pressure dual sensor of claim 1, wherein the finger print and pressure dual sensor has a driving frequency that is equal to or greater than 10 kHz and is equal to or less than 1 MHz, a change in capacitance that is equal to or greater than 0.01% and is equal to or less than 50% according to a ridge and a valley of a finger print, and a driving voltage in a range between 1 and 100 V.

20. A method of manufacturing a finger print and pressure dual sensor, the method comprising:
    forming first electrodes that extend in a first direction and source electrodes and drain electrodes disposed to face each other in the first direction, on a substrate;
    forming channel regions that electrically connect the corresponding source electrode and drain electrode to each other, on the substrate;
    forming a first dielectric layer that covers the first electrodes, the source electrodes and the drain electrodes and has first openings for exposing the channel region, on the substrate;
    forming second electrodes that extend in a second direction, on the first dielectric layer;
    forming a second dielectric layer that covers the second electrodes and has second openings for exposing the channel region, on the first dielectric layer;
    forming gate electrodes that extend in the second direction and disposed on the channel region so as to correspond to the channel region, on the second dielectric layer; and
    forming a cover layer that covers the gate electrodes, on the second dielectric layer.

* * * * *